(12) United States Patent
Tamashima

(10) Patent No.: US 9,870,179 B2
(45) Date of Patent: Jan. 16, 2018

(54) INFORMATION PROCESSING APPARATUS, INFORMATION PROCESSING METHOD, AND IMAGE PROCESSING SYSTEM

(71) Applicant: Daisuke Tamashima, Kanagawa (JP)

(72) Inventor: Daisuke Tamashima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/455,525

(22) Filed: Mar. 10, 2017

(65) Prior Publication Data

US 2017/0262233 A1 Sep. 14, 2017

(30) Foreign Application Priority Data

Mar. 14, 2016 (JP) ................................. 2016-050208
Feb. 22, 2017 (JP) ................................. 2017-031126

(51) Int. Cl.
*G06F 3/12* (2006.01)

(52) U.S. Cl.
CPC .......... *G06F 3/1226* (2013.01); *G06F 3/1205* (2013.01); *G06F 3/1232* (2013.01); *G06F 3/1284* (2013.01); *G06F 3/1291* (2013.01)

(58) Field of Classification Search
CPC .... G06F 3/1226; G06F 3/1205; G06F 3/1284; G06F 3/1232; G06F 3/1291
USPC ....................................................... 358/1.15
See application file for complete search history.

(56) References Cited

U.S. PATENT DOCUMENTS

| 8,285,210 | B2 * | 10/2012 | Oshima | H04W 4/02 |
| | | | | 358/1.15 |
| 8,760,680 | B2 | 6/2014 | Tamashima | |
| 8,922,823 | B2 | 12/2014 | Tamashima | |
| 2011/0038003 | A1 * | 2/2011 | Nakamura | G06F 3/1208 |
| | | | | 358/1.15 |
| 2012/0140249 | A1 | 6/2012 | Tamashima | |
| 2014/0211235 | A1 * | 7/2014 | Taniguchi | G06K 15/406 |
| | | | | 358/1.14 |
| 2015/0248259 | A1 * | 9/2015 | Kumagai | G06F 3/1228 |
| | | | | 358/1.13 |

FOREIGN PATENT DOCUMENTS

JP 2010-165059 7/2010

* cited by examiner

*Primary Examiner* — Allen H Nguyen
(74) *Attorney, Agent, or Firm* — Ipusa, PLLC

(57) ABSTRACT

An information processing apparatus includes processors configured to execute computer-executable instructions to execute a process including reading first setting information indicating a first setting content with respect to a first device; referring to function information indicating one or more functions of a second device, and determining whether there is a function, which is not included in the one or more functions of the second device, among one or more functions corresponding to the first setting content; and referring to first term information including a term indicating the first setting content, when there is the function corresponding to the first setting content that is determined as not being included in the one or more functions of the second device, and displaying, on the display device, the function, which is determined as not being included in the one or more functions of the second device, in association with the term.

9 Claims, 23 Drawing Sheets

FIG.4

PRINT SETTING

| SIMPLE SETTING | SETTINGS PER ITEM | INITIAL SETTING/VERSION |

PRINTING METHOD:
REGULAR PRINTING

ORIGINAL DOCUMENT SIZE: 411
A4(210 × 297 mm)

ORIGINAL DOCUMENT ORIENTATION:
⦿ VERTICAL
◯ HORIZONTAL

DETAILS...

PRINTING SHEET SIZE:
SAME AS ORIGINAL DOCUMENT SIZE

SHEET FEEDING TRAY: 412
TRAY 4

SHEET TYPE:
PLAIN PAPER/RECYCLED PAPER

COMBINE:
NONE

ARRANGEMENT OF PAGES:
NONE

DOUBLE-SIDED:
LONG EDGE BINDING (LEFT OPENING/TOP OPENING)

BOOK BINDING:
NONE

ARRANGEMENT OF PAGES:
LEFT OPENING/TOP OPENING

STAPLE:
NONE

HOLE PUNCH:
NONE

COLOR/MONOCHROME:
COLOR

NUMBER OF COPIES:
(FROM 1 TO 999)
1

416

PRESENT SETTING

SIMPLE SETTING 1
ORIGINAL DOCUMENT SIZE:
A4(210×297 mm)
PRINT SHEET SIZE:
SAME AS ORIGINAL DOCUMENT SIZE
MAGNIFICATION:
NONE

LIST OF SETTING CONTENTS... 413

REGISTER IN SIMPLE SETTING...

SIMPLE SETTING LIST: 414

415 — COMBINE
417 — DOUBLE-SIDED
STAPLE (DOUBLE-SIDED)
SIMPLE SETTING 1 expand

ORGANIZE SIMPLE SETTING LIST

OK    CANCEL    APPLY(A)    HELP

```
{
    "name":"SIMPLE SETTING 1",
    "settings":
    {
        "document_size":"A4",
        "color":"color",
        "Tray":"Tray4",
        "duplex":"longedge"
    }
}
```

FIG.9

```
{                LI, SP              TE
    "document_size":"SHEET SIZE",
    "A3":"A3",
    "A4":"A4",
    "A5":"A5",
    "color":"COLOR",
    "mono":"MONOCHROME",
    "Tray":"TRAY",
    "Tray1":"TRAY 1",
    "Tray2":"TRAY 2",
    "Tray3":"TRAY 3",
    "Tray4":"TRAY 4",
    "duplex":"DOUBLE-SIDED",
    "longedge":"LONG EDGE BINDING",
    "shortedge":"SHORT EDGE BINDING",
}
```
— 40

FIG.10

| | | | 260 |
|---|---|---|---|
| FUNCTION MANAGING UNIT | | | |

| ITEM | SETTING VALUE | OPTION | PROHIBITION | PRIORITY |
|---|---|---|---|---|
| document_size | A3 | A3<br>A4<br>A5 | NONE | 80 |
| color | mono | color<br>mono | NONE | 100 |
| Tray | tray1 | tray1<br>tray2<br>tray3 | NONE | 50 |

(261 label points to header row)

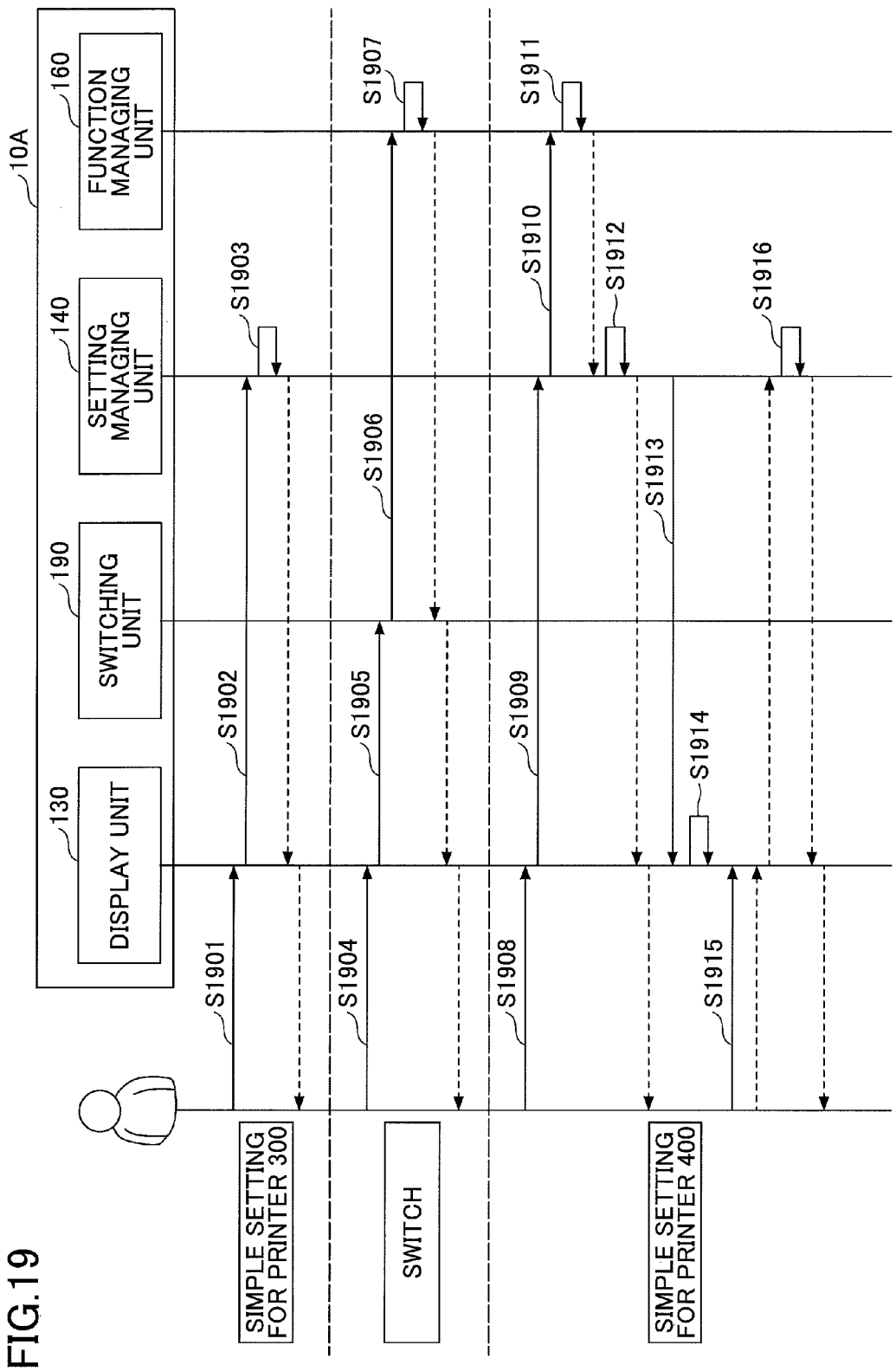

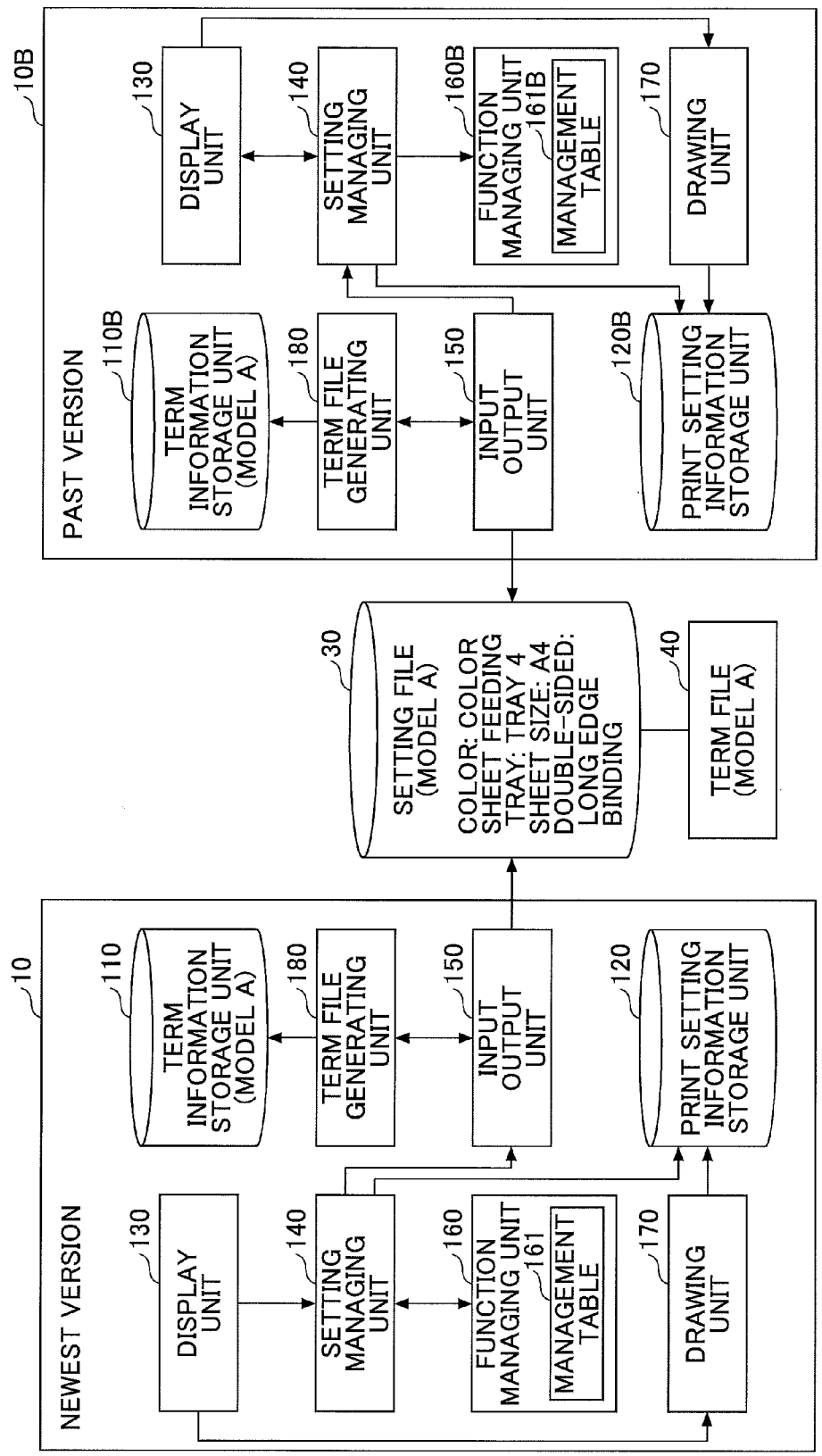

INFORMATION PROCESSING APPARATUS, INFORMATION PROCESSING METHOD, AND IMAGE PROCESSING SYSTEM

CROSS-REFERENCE TO RELATED APPLICATION

The present application claims priority under 35 U.S.C. §119 to Japanese Patent Application No. 2016-050208, filed on Mar. 14, 2016 and Japanese Patent Application No. 2017-031126, filed on Feb. 22, 2017, the contents of which are incorporated herein by reference in their entirety.

BACKGROUND OF THE INVENTION

1. Field of the Invention

The present invention relates to an information processing apparatus, an information processing method, and an image processing system.

2. Description of the Related Art

Conventionally, when performing printing by using a printer from an information processing apparatus such as a personal computer (PC), etc., there is known a technology of making various print settings in a printer driver corresponding to the model of the printer.

Furthermore, conventionally, when switching printers to be the output destination of the data, there is known a technology of setting preset values of print setting items to be handed over to the printer to which the output destination has been switched, by handover information indicating whether to hand over preset values of print setting items (see, for example, Patent Document 1).

Patent Document 1: Japanese Unexamined Patent Application Publication No. 2010-165059

SUMMARY OF THE INVENTION

An aspect of the present invention provides an information processing apparatus, an information processing method, and an image processing system in which one or more of the above-described disadvantages are reduced.

According to one aspect of the present invention, there is provided an information processing apparatus including a memory configured to store computer-executable instructions; and one or more processors configured to execute the computer-executable instructions such that the one or more processors execute a process including reading first setting information indicating a first setting content with respect to a first device, the first setting information being input to the information processing apparatus by a user via a display device; referring to function information indicating one or more functions of a second device, and determining whether there is a function, which is not included in the one or more functions of the second device, among one or more functions corresponding to the first setting content; and referring to first term information including a term indicating the first setting content, when there is the function corresponding to the first setting content that is determined as not being included in the one or more functions of the second device, and displaying, on the display device, the function, which is determined as not being included in the one or more functions of the second device, in association with the term, such that the function of the first device that cannot be applied to the second device is presented to the user.

BRIEF DESCRIPTION OF THE DRAWINGS

Other objects, features and advantages of the present invention will become more apparent from the following detailed description when read in conjunction with the accompanying drawings, in which:

FIG. 4 illustrates an example of a screen for making a simple setting according to the first embodiment of the present invention;

FIG. 8 illustrates an example of a setting file according to the first embodiment of the present invention;

FIG. 9 illustrates an example of a term file according to the first embodiment of the present invention;

FIG. 10 is for describing a function managing unit according to the first embodiment of the present invention;

FIG. 19 is a sequence diagram of an operation of the printer driver according to the second embodiment of the present invention;

FIG. 25 is a functional block diagram of the printer driver according to a third embodiment of the present invention.

DETAILED DESCRIPTION OF THE PREFERRED EMBODIMENTS

In the related art, when an attempt is made to apply (reflect) print settings, which are set in a printer driver corresponding to a printer of a certain model, to a printer driver corresponding to a printer of a different model, there may be cases where the print settings cannot be applied due to differences in the functions, etc., between the printers.

Here, at the printer driver that is the target of applying the print settings, when the setting, which cannot be applied, is a setting relevant to a function that is included in the printer corresponding to the printer driver, the printer driver will have the information relevant to this function, and therefore the printer driver is able to present which setting relevant to which function cannot be applied. Note that in this case, the reason why the print setting cannot be applied to the printer driver may be, for example, that there is a prohibition, etc., between functions included in the printer.

However, when the print settings that cannot be applied include a setting relevant to a function, which is not included in the printer corresponding to the printer driver that is the target of applying the print settings, the printer driver is unable to present which setting relevant to which function cannot be applied.

Therefore, in a printer of the related art, when there are settings, which cannot be applied to the printer driver, have been made in another printer driver, it has been difficult to present the contents of the settings that cannot be applied.

A problem to be solved by an embodiment of the present invention is to present, to a user, the contents of settings that have not been applied, when applying settings.

Embodiments of the present invention will be described by referring to the accompanying drawings.

First Embodiment

Figure 1:
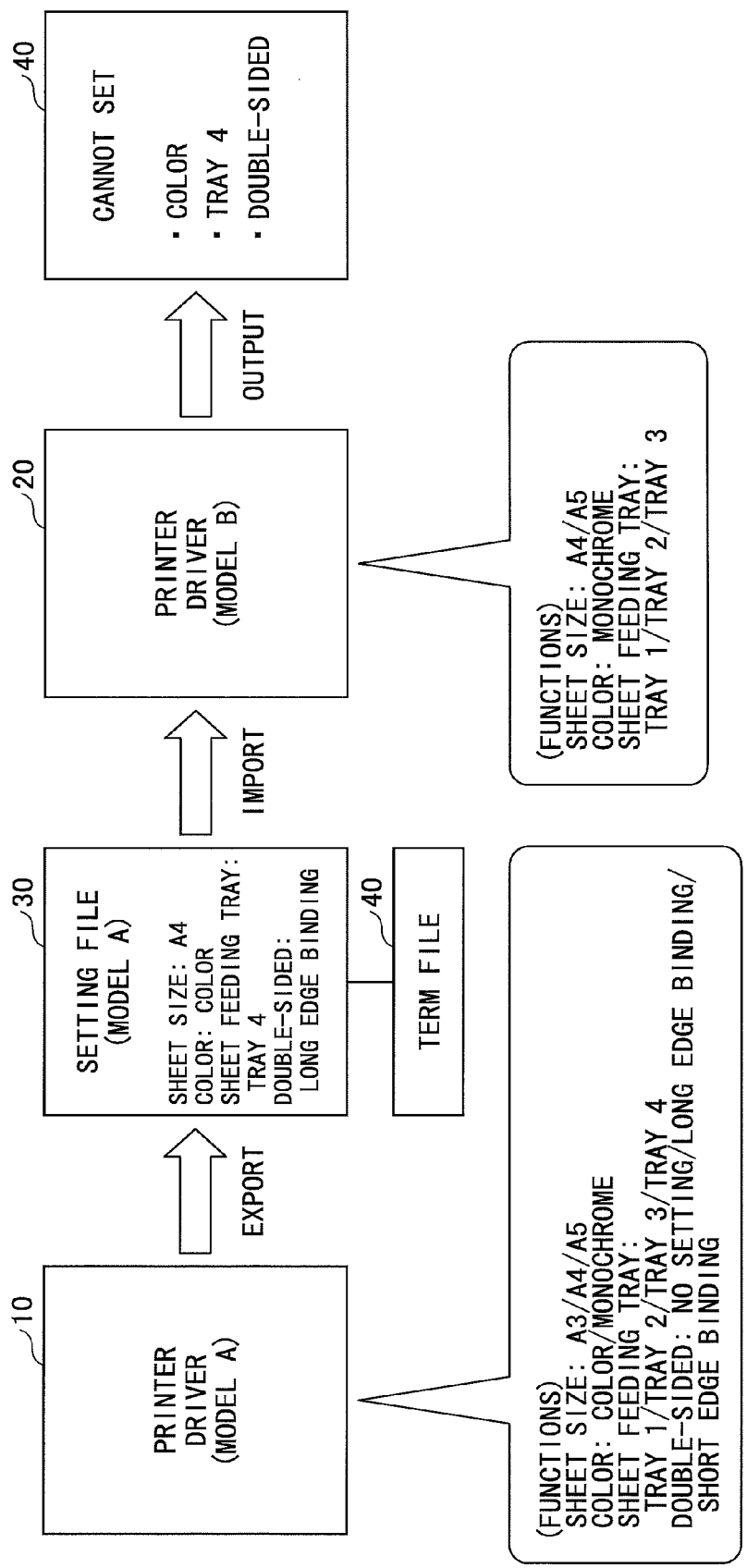
FIG. 1 illustrates the overview of a first embodiment of the present invention.

A description of a first embodiment is given by referring to drawings. FIG. 1 illustrates the overview of a first embodiment.

The present embodiment is relevant to a process of applying (reflecting) print settings, which have been set in a printer driver 10 corresponding to a printer of a model A, to a printer driver 20 corresponding to a printer of a model B. In the present embodiment, if the print settings cannot be applied as a result of this process, the content of the processing result is output.

For example, the printer of the model A corresponding to the printer driver 10 is able to select A3, A4, and A5, as options of sizes of original documents. With respect to the color of printing, the printer of the model A corresponding to the printer driver 10 is able to select color or monochrome, as options of the color. Furthermore, the printer of the model A corresponding to the printer driver 10 is able to select trays 1 through 4, as options of sheet feeding trays. Furthermore, the printer of the model A corresponding to the printer driver 10 is able to select no setting, long edge binding, and short edge binding, as options of settings of double-sided printing.

Furthermore, the printer of the model B corresponding to the printer driver 20 is able to select A4 and A5, as options of sizes of original documents. The printer of the model B corresponding to the printer driver 20 is able to select monochrome, as the option of the color of printing. Furthermore, the printer of the model B corresponding to the printer driver 20 is able to select tray 1, as the option of the sheet feeding tray.

Here, a description is given of a case of applying the print settings, which have been set with respect to the printer of the model A in the printer driver 10, to the printer driver 20.

In this case, the print setting information, which indicates the contents of the print settings in the printer driver 10, is exported to become a print setting file 30 that is an external file. The print setting information according to the present embodiment is referred to, when the printer driver generates print data to be drawn on a recording medium. In the following description, a print setting file is simply referred to as a setting file.

In the setting file 30 illustrated in FIG. 1, "A4" is selected as the sheet size, "color" is selected as the color of printing, "tray 4" is selected as the sheet feeding tray, and "long edge binding" is selected for double-sided printing.

In this case, the printer driver 10 according to the present embodiment generates a term file 40 that is text data indicating the contents of the setting file 30, and outputs the term file 40 together with the setting file 30 as an external file.

This term file 40 is, for example, text data indicating items and setting values, etc., included in the setting file 30, as the terms corresponding to the printer of the model A. Details of the term file 40 are described below.

The printer driver 20 imports the setting file 30, and performs a process of applying the setting file 30. Note that, for example, the process of applying the setting file 30 may be executed when a print instruction is given with respect to the printer of the model B, or may be executed when the setting file 30 is imported. Furthermore, in the printer driver 20, when the setting file 30 is imported, the term file 40 is also imported together with the setting file 30.

When the setting file 30 is imported, the printer driver 20 performs the process of applying the setting file 30.

Specifically, the printer driver 20 determines whether it is possible to select the item of the print setting included in the setting file 30 and the setting value corresponding to the item. When the same setting values as those of the printer driver 20 can be selected with respect to all of the items, the printer driver 20 applies the setting file 30.

Furthermore, when the printer driver 20 does not include the function that corresponds to the item included in the setting file 30, or when the printer driver 20 does not include the setting value included in the setting file 30, the setting file 30 cannot be applied, and therefore the content of the processing result is output.

In the example of FIG. 1, the printer of the model B is able to select the sheet size "A4" included in the setting file 30; however, setting values corresponding to "color" and "tray 4" are not included in the printer driver 20. Furthermore, the printer of the model B does not include a function corresponding to the item "double-sided". Therefore, the setting file 30 is not applied to the printer driver 20.

Therefore, the printer driver 20 according to the present embodiment acquires, from the term file 40, "color" and "tray 4" that are terms (text) indicating setting values that are not included in the printer driver 20, and "double-sided" that is a term (text) indicating an item that is not included in the printer driver 20. Then, the printer driver 20 uses these terms to output the setting values and items that cannot be applied, and presents, to the user of the printer driver 20, the content of the result of the applying process, when the setting file 30 cannot be applied.

As described above, when a setting file exported as an external file cannot be applied, the printer driver according to the present embodiment refers to the term file, and outputs terms corresponding to the items and setting values that cannot be applied. Therefore, the content of the result of applying process can be correctly presented to the user.

Note that in the present embodiment, the printer driver 10 and the printer driver 20 may be installed in a single information processing apparatus, or the printer driver 10 and the printer driver 20 may be respectively installed in separate information processing apparatuses.

In the following, a description is given of a case where the printer driver 10 and the printer driver 20 are respectively installed in separate information processing apparatuses.

Figure 2:
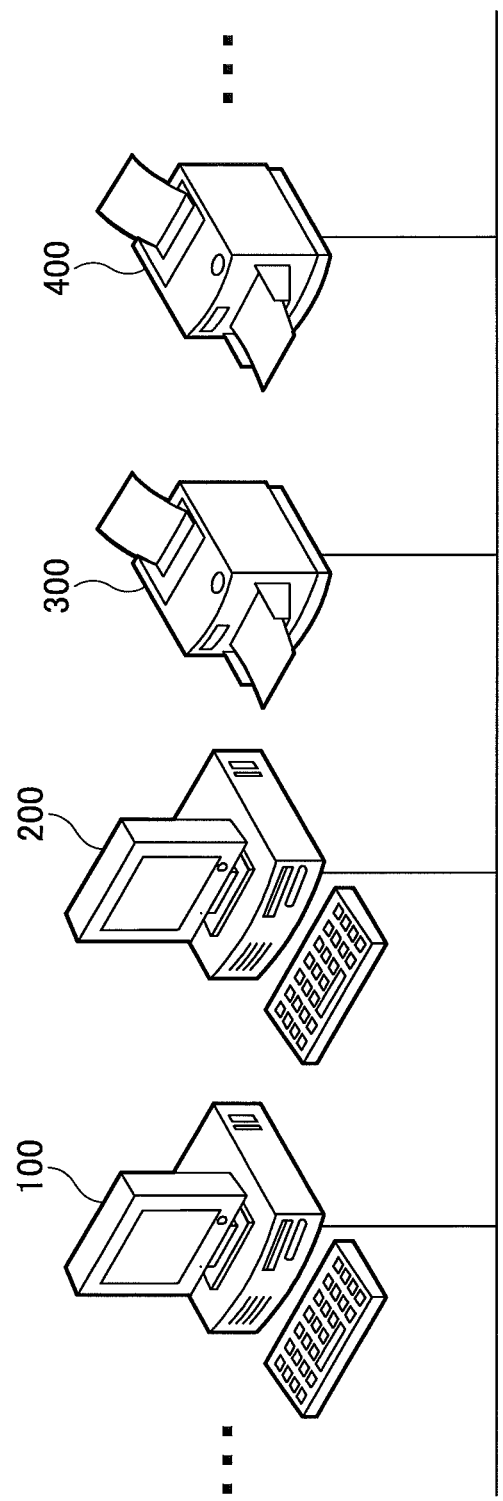
FIG. 2 illustrates an example of an overall configuration using information processing apparatuses according to the first embodiment of the present invention.

FIG. 2 illustrates an example of an overall configuration using information processing apparatuses according to the first embodiment. In the example described below, as illustrated, an information processing apparatus 100, an information processing apparatus 200, a printer 300, and a printer 400 are coupled to each other by a network or a cable, etc.

In the information processing apparatus 100 and the information processing apparatus 200, the printer driver 10 and the printer driver 20 are respectively installed in advance. The printer driver 10 and the printer driver 20 are programs for causing image processing apparatuses such as the printer 300 and the printer 400 to execute image processing. Then, the user, etc., inputs an operation for causing the printer, etc., to perform image processing on a document file, etc., to the information processing apparatus in which the printer driver is installed in advance. Furthermore, in the printer driver, a setting relevant to image processing is made, in order to cause a coupled image processing apparatus to perform image processing. Note that a setting relevant to image processing is, said differently, a setting relevant to printing, and is a print setting.

The information processing apparatus 100 and the information processing apparatus 200, etc., for example, have the following hardware configuration.

Figure 3:
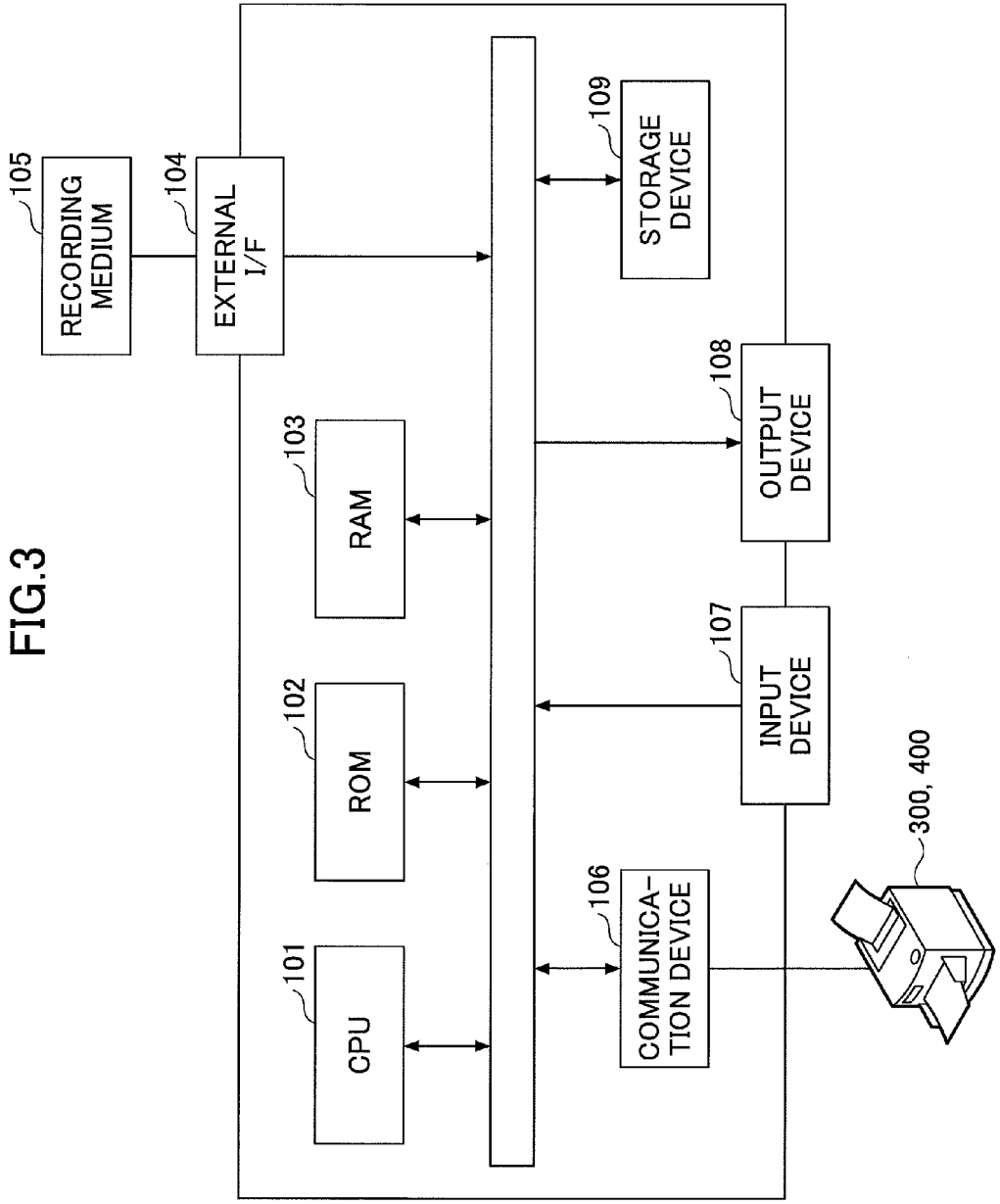
FIG. 3 is an example of a hardware block diagram of an information processing apparatus according to the first embodiment of the present invention.

FIG. 3 is an example of a hardware block diagram of the information processing apparatus. For example, the information processing apparatus 100 and the information processing apparatus 200 are computers having the following hardware configuration. In the example described below, the information processing apparatus 100 and the information processing apparatus 200 have the same hardware configuration. Therefore, the following description, the information processing apparatus 100 is taken as an example, and the description of the information processing apparatus 200 is omitted.

In the illustrated example, the information processing apparatus 100 includes a Central Processing Unit (CPU) 101 (an example of one or more processors), a Read-Only Memory (ROM) 102, and a Random Access Memory (RAM) 103. Furthermore, the information processing apparatus 100 includes an external interface (I/F) 104, a communication device 106, an input device 107, an output device 108, and a storage device 109.

The CPU 101 is an arithmetic device for performing operations and processing data to implement processes, and a control device for controlling the hardware. The ROM 102 is a storage device for storing programs such as firmware. The RAM 103 is a storage device that is used as a work area when operations are performed.

The external I/F 104 is an interface for inputting and outputting files, etc., with respect to a recording medium 105 that is coupled to the information processing apparatus 100, such as a Universal Serial Bus (USB) memory, etc. For example, the external I/F 104 is a connector, a cable, and a driver, etc.

The communication device 106 is a device for performing communication with an external device such as the printer 300 via a network, etc. For example, the communication device 106 is a connector, a cable, and a driver, etc.

The input device 107 is an interface for inputting operations by a user and data from an external device coupled to the information processing apparatus 100. For example, the input device 107 is a keyboard or a mouse or a combination of these elements, etc. Furthermore, the input device 107 is a connector and a driver, etc., for coupling a keyboard.

The output device 108 is an interface for displaying data to a user and outputting data to an external device that is coupled to the information processing apparatus 100. For example, the output device 108 is a display, etc. Furthermore, the output device 108 is a connector and a driver, etc., for coupling a display etc.

The storage device 109 stores input data and programs, etc. Furthermore, the storage device 109 is a main memory and a secondary memory, etc.

Note that the hardware configuration is not limited to that illustrated in FIG. 3. For example, the hardware configuration may further include an arithmetic device, a control device, or a storage device, provided internally or externally. Furthermore, the information processing apparatus may not be a single apparatus; the information processing apparatus may be formed of a plurality of apparatuses.

There are many cases where there are a plurality of items of print settings. Thus, in order to reduce the trouble taken by the user to set the values of the respective items, for example, a setting method of setting a plurality of times by one click (hereinafter referred to as "simple setting") is considered. For example, the simple setting is performed as follows.

FIG. 4 illustrates an example of a screen for making a simple setting. A screen 41 illustrated in FIG. 4 is an example of a screen displayed on the information processing apparatus 100. In the screen 41, for example, an original document size setting field 411, etc., which is a setting field relevant to the sheet, and a sheet feeding tray setting field 412, etc., which is a setting field relevant to equipment of the printer, are displayed. In the present embodiment, the user can perform operations for specifying setting values with respect to these setting fields to make desired settings.

Then, the printer driver 10 stores the information indicating setting values, etc., with respect to the plurality of items set by the user's operations, as print setting information. For example, when the user performs an operation of pressing a button 413 of "register in simple setting" in the screen 41, the information processing apparatus 100 generates print setting information including an item and a setting value with respect to the item, and stores the generated print setting information.

On the other hand, when print setting information is stored, the printer driver 10 is able to perform drawing based on the stored print setting information.

In a "simple setting list" 414 in the screen 41, a list of setting files are indicated as a list of icons of setting files.

For example, in the "simple setting list" 414 of the screen 41, it is assumed that a "combine" icon 415 and a "double-sided" icon 417, etc., are selected. In this case, the item and the setting value included in the setting file corresponding to the "combine" icon 415, are applied to a "combine" setting field 416 on the right side of the screen 41.

Furthermore, a setting file indicating "simple setting", etc., as described above may be output in a "file" format. For example, by a screen described below, a file indicating the setting file may be output.

Figure 5:
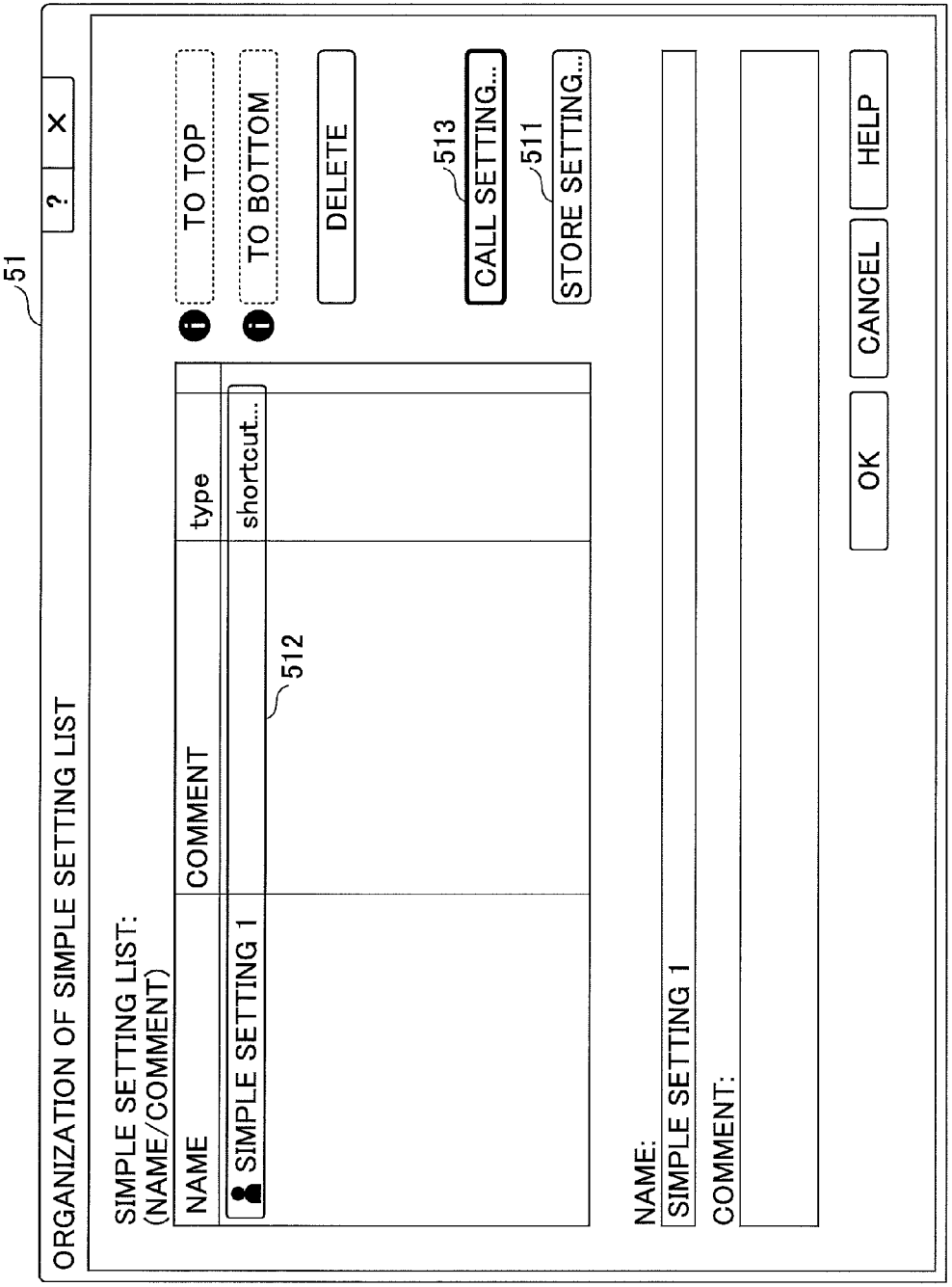
FIG. 5 illustrates an example of a screen relevant to the inputting and the outputting of a file according to the first embodiment of the present invention.

FIG. 5 illustrates an example of a screen relevant to the inputting and the outputting of a file. In the present embodiment, when the user presses a button 511 of "store setting" in a screen 51 illustrated in FIG. 5, the printer driver 10 outputs print setting information 512. Note that outputting the print setting information means to export the setting file 30 including the print setting information, as a file that can be imported into another printer driver.

Furthermore, the setting file may be input to another printer driver (the printer driver 20). In the example of the screen 51, when the user presses a button 513 of "call setting", the printer driver 20 inputs the setting file 30. Note that inputting the setting file 30 means so-called importing the setting file 30.

In the following, by referring to FIG. 6, a description is given of functions of the printer driver 10 and the printer driver 20 according to the present embodiment. Note that the printer driver 10 and the printer driver 20 according to the present embodiment have the same functions, and therefore in FIG. 6, functions of the printer driver 10 are mainly described.

Figure 6:
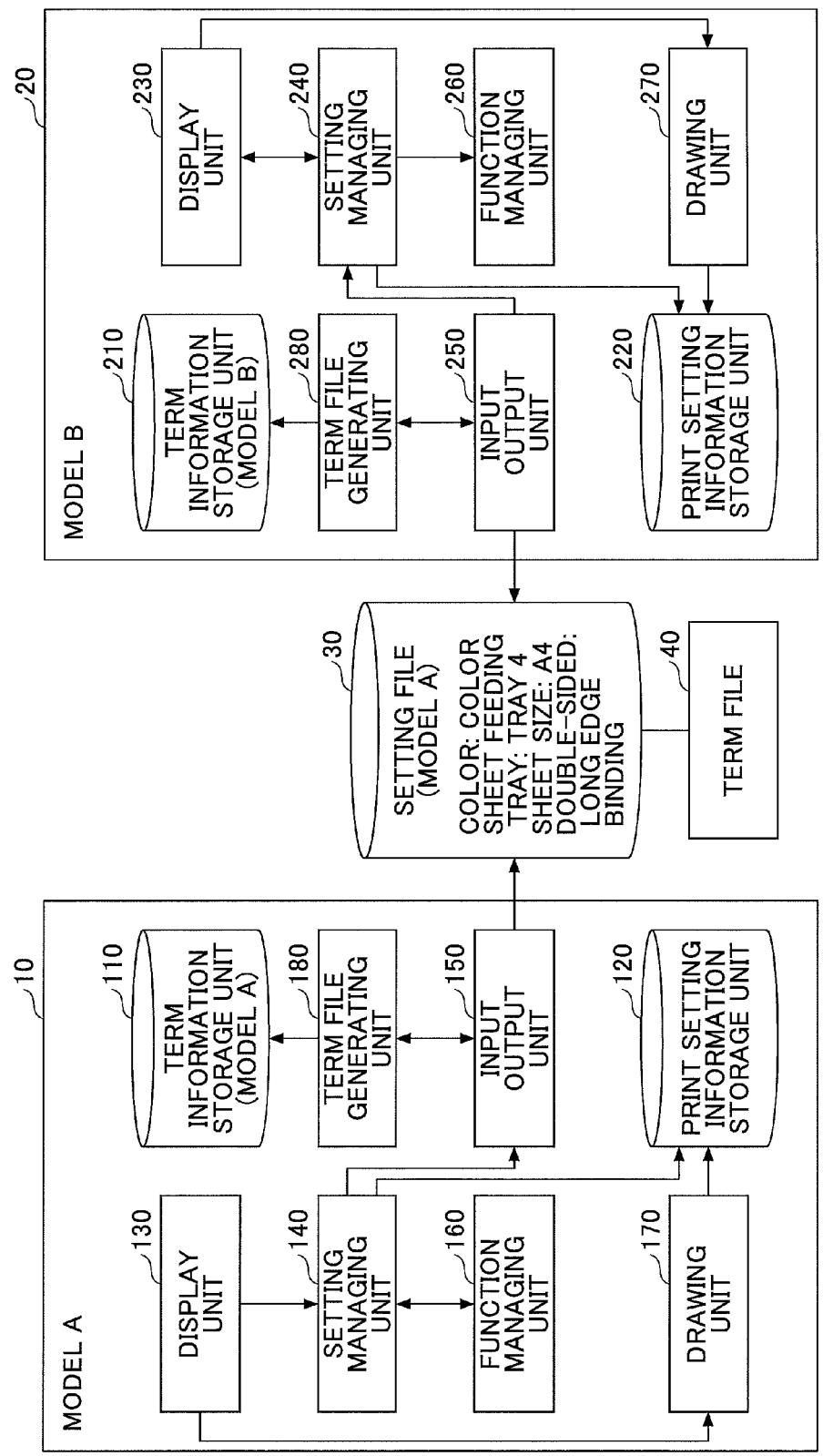
FIG. 6 is a functional block diagram of a printer driver according to the first embodiment of the present invention.

FIG. 6 is a functional block diagram of the printer driver according to the first embodiment. The units included in the printer driver 10 according to the present embodiment are realized as the printer driver 10 is installed in the information processing apparatus 100 and the CPU 101 of the information processing apparatus 100 reads and executes the printer driver 10 stored in the storage device 109.

For example, the printer driver 10 includes a term information storage unit 110, a print setting information storage unit 120, a display unit 130, a setting managing unit 140, an input output unit 150, a function managing unit 160, a drawing unit 170, and a term file generating unit 180.

Furthermore, the printer driver 20 includes a term information storage unit 210, a print setting information storage unit 220, a display unit 230, a setting managing unit 240, an input output unit 250, a function managing unit 260, a drawing unit 270, and a term file generating unit 280.

The term information storage unit 110 stores text data indicating the functions and setting values of the printer of the model A. Note that the text data stored in the term information storage unit 110 includes text data in languages of countries including Japanese.

The print setting information storage unit 120 stores the print setting information that has been stored in the printer driver 10.

The display unit 130 displays screens illustrated in FIGS. 4 and 5, etc., for example, on the output device 108, etc., of the information processing apparatus 100. Furthermore, the display unit 130 displays the contents of results of a process of applying a setting file imported from outside.

The setting managing unit 140 manages the print setting information. Specifically, the setting managing unit 140 determines whether the setting file has been applied, from the result of a process of applying the setting file, and when the setting file is applied, the setting managing unit 140 stores the setting file as print setting information in the print setting information storage unit 120.

The input output unit 150 inputs (reads) and outputs print setting information and term files, etc.

The function managing unit 160 performs a process of applying an imported setting file. Furthermore, the function managing unit 160 reports the result of applying the setting file, to the setting managing unit 140.

The drawing unit 170 generates print data based on the print setting information. In the present embodiment, when the print data is sent to the printer, the printer forms an image on a sheet, etc., based on the print data.

The term file generating unit 180 refers to the term information storage unit 110, and generates a term file including text data indicating an item and a setting value included in the print setting information.

Note that the functions of the units included in the printer driver 20 are the same as the functions of the units included in the printer driver 10, and therefore descriptions of the functions of the units included in the printer driver 20 are omitted.

Figure 7:
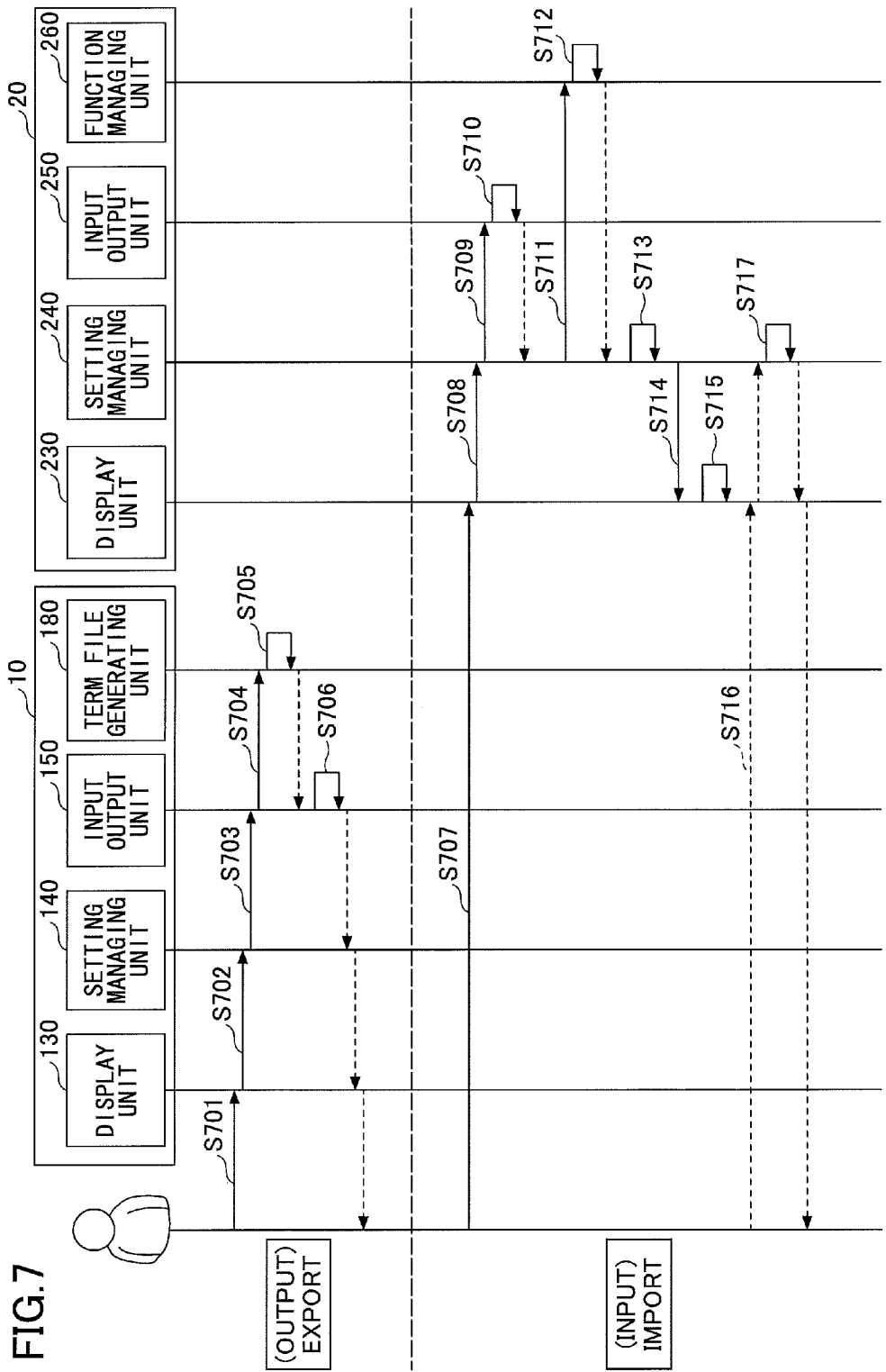
FIG. 7 is a sequence diagram of a process of applying a setting file performed by the printer driver according to the first embodiment of the present invention.

FIG. 7 is a sequence diagram of a process of applying a setting file performed by the printer driver according to the first embodiment.

FIG. 7 illustrates a process of importing and applying the setting file 30, which is exported by the printer driver 10, to the printer driver 20.

First, the printer driver 10 preforms a process of exporting the print setting information as the setting file 30.

First a description is given of a process by the printer driver 10.

The printer driver 10 accepts, by an operation to the display unit 130, print setting information stored in the print setting information storage unit 120, as the setting file 30 (step S701). Specifically, for example, the display unit 130 accepts an operation with respect to the button 511 of "store setting", in the screen 51 illustrated in FIG. 5.

Next, the printer driver 10 reports a request to output the setting file 30 to the setting managing unit 140, by the display unit 130 (step S702).

Next, the printer driver 10 reports the request to output the setting file 30 to the input output unit 150, by the setting managing unit 140 (step S703). The input output unit 150 receives this report, and reports an instruction to generate the term file 40 corresponding to the setting file 30 for which the output request has been accepted, to the term file generating unit 180 (step S704).

The term file generating unit 180 receives the generation instruction, refers to the term information storage unit 110, generates the term file 40 corresponding to the setting file 30, and transfers the generated term file 40 to the input output unit 150 (step S705). The input output unit 150 outputs the setting file 30 and the term file 40 (step S706).

Note that in the present embodiment, the term file generating unit 180 generates and outputs the term file 40 corresponding to the setting file 30; however, the present embodiment is not so limited. The printer driver 10 may output all of the information items stored in the term information storage unit 110, together with the setting file 30.

Next, the printer driver 20 performs the process of importing and applying the setting file 30.

In the following, a description is given of a process by the printer driver 20.

The printer driver 20 accepts, by the display unit 230, an operation of inputting the setting file 30 and the term file 40 (step S707). Specifically, the printer driver 20 accepts, by the display unit 230, an operation with respect to the button 513 of "call setting" in the screen 51 illustrated in FIG. 5.

Next, the printer driver 20 reports, by the display unit 230, a request to input the setting file 30 and the term file 40, to the setting managing unit 240 (step S708). Next, the printer driver 20 reports, by the setting managing unit 240, the request to input the setting file 30 and the term file 40, to the input output unit 250 (step S709).

The printer driver 20 accepts, by the input output unit 250, the input of the setting file 30 and the term file 40 (step S710). Then, the input output unit 250 sends the setting file 30 and the term file 40 to the setting managing unit 240.

The printer driver 20 transfers, by the setting managing unit 240, the setting file 30 and the term file 40 to the function managing unit 260, and makes a request to execute a process of applying the setting file 30 (step S711).

The printer driver 20 performs, by the function managing unit 260, a process of applying the setting file 30 (step S712), and reports the completion of the process to the setting managing unit 240. Next, the printer driver 20 determines, by the setting managing unit 240, whether the setting file 30 has been applied, based on the result of the process by the function managing unit 260 (step S713). Details of the processes of steps S712 and S713 are described below.

Then, when the setting managing unit 240 determines that the setting file 30 is not applied, the setting managing unit 240 requests the display unit 130 to display the result of the process (step S714).

Furthermore, the printer driver 20 displays, by the display unit 230, a change screen for changing the content of the setting file 30 (step S715). Details of the change screen are described below.

When the display unit 230 accepts a change in the content of the setting file 30 at the change screen (step S716), the setting managing unit 240 applies the content of the change to the setting file 30. Then, the setting managing unit 240 stores the setting file 30 in the print setting information storage unit 220 (step S717), and ends the process.

Note that in the example of FIG. 7, the process of exporting the setting file 30 by the printer driver 10 and the process of importing and applying the setting file 30 by the printer driver 20 are described as continuous operations; however, the present embodiment is not so limited. The setting file 30, which is exported by the printer driver 10, is to be imported to the printer driver 20 at any timing, for example, in response to a user's instruction, etc.

Furthermore, in the present embodiment, for example, a combo box and a check box, etc., may be used in the screen used for exporting the print setting information as a setting file, and in the screen used for specifying the setting file to be imported, etc. Particularly, in the present embodiment, it is preferable if the screen used for exporting and the screen used for importing have the same format, because it is often easier for the user to operate.

Next, by referring to FIG. 8, a description is given of the setting file 30 according to the present embodiment. FIG. 8 illustrates an example of the setting file 30 according to the present embodiment.

In the example of FIG. 8, the setting file 30 is data described in the JavaScript (registered trademark) Object Notation (JSON) format. Furthermore, a file indicating the setting file 30 is, for example, in a text format. Note that the setting file 30 may be in a format other than the JSON format.

In the setting file 30, a simple setting name NA is input. Note that the simple setting name NA is a character string, etc., input to "name" by, for example, an output operation performed in the screen illustrated in FIG. 8. In this way, the user can input the name of the setting file 30 in "name" to apply a name to each setting file and register each setting file.

Furthermore, the setting file 30 includes setting values of four items set by the "simple setting". Specifically, in the setting file 30, an item and a setting value set for the item are input in association with each other in one line. By the setting file 30 illustrated in FIG. 8, four items and setting values are set. Specifically, items LI include the four items of "document_size", "color", "Tray", and "duplex". Furthermore, setting values SP include the four setting values of "A4", "color", "Tray4", and "longedge".

In the setting file 30, the item "document_size" indicates a function of selecting a size of an original document sheet. In FIG. 8, the setting value corresponding to "document_size" is "A4". The item "color" indicates a function relevant to color printing, such as color printing and monochrome printing, etc. In FIG. 8, the setting value corresponding to the item "color" is "color". Furthermore, the item "Tray" indicates a function of selecting the type of tray, and in FIG. 8, the setting value corresponding to the item "Tray" is "Tray4". Furthermore, the item "duplex" indicates a function of double-sided printing, and in FIG. 8, the setting value corresponding to the item "duplex" is "longedge".

Next, by referring to FIG. 9, a description is given of the term file 40. FIG. 9 illustrates an example of the term file 40 according to the first embodiment.

The term file 40 according to the present embodiment is data described in the JSON format, similar to the setting file 30. Furthermore, the file indicating the term file 40 is, for example, in a text format. Note that the term file 40 may be in a format other than the JSON format.

First, the term file 40 includes the items LI and the setting values SP input to the setting file 30, and text data TE corresponding to the items LI and the setting values SP.

In the example of FIG. 9, an item "document_size" included in the items LI is a function explained by a term "sheet size". In this way, the term file 40 includes terms (text data) explaining the respective items LI and the respective setting values SP included in the setting file 30.

Next, by referring to FIGS. 10 through 14, a description is given of the operation of applying the setting file 30, performed by the setting managing units 140 and 240 and the function managing units 160 and 260 according to the present embodiment.

First, a description is given of the function managing units 160 and 260. FIG. 10 is for describing the function managing unit according to the first embodiment. Note that the function managing units 160 and 260 have similar configurations, and therefore as a matter of convenience, the function managing unit 260 is described in this section.

The function managing unit 260 according to the present embodiment includes a management table 261 for managing the states of print settings set with respect to the printer driver 20. The management table 261 according to the present embodiment is an example of function information indicating the functions of the printer 400 to which the printer driver 20 corresponds.

The management table 261 according to the present embodiment includes an item, a setting value, option, prohibition, and priority. The value of "item" in the management table 261 indicates an item corresponding to a function of the printer to which the printer driver 20 corresponds. Said differently, "item" in the management table 261 is an item relevant to print settings included in the setting file.

The value of the item "setting value" is a value set with respect to the item. The value of the item "option" indicates a setting value that can be set with respect to the corresponding item. In the management table 261, a value, which is selected from values of the item "option", becomes the value of the item "setting value".

The value of the item "prohibition" indicates the prohibition in the print settings. The value of the item "priority" indicates the priority of each item.

In the management table 261 of FIG. 10, values that can be set for the item "document_size" are A3, A4, and A5, and a value "A3" is set as the setting value. Furthermore, in the management table 261, there is no prohibition with respect to the item "document_size", and the value of the priority of the item "document_size" is "80".

Figure 11:
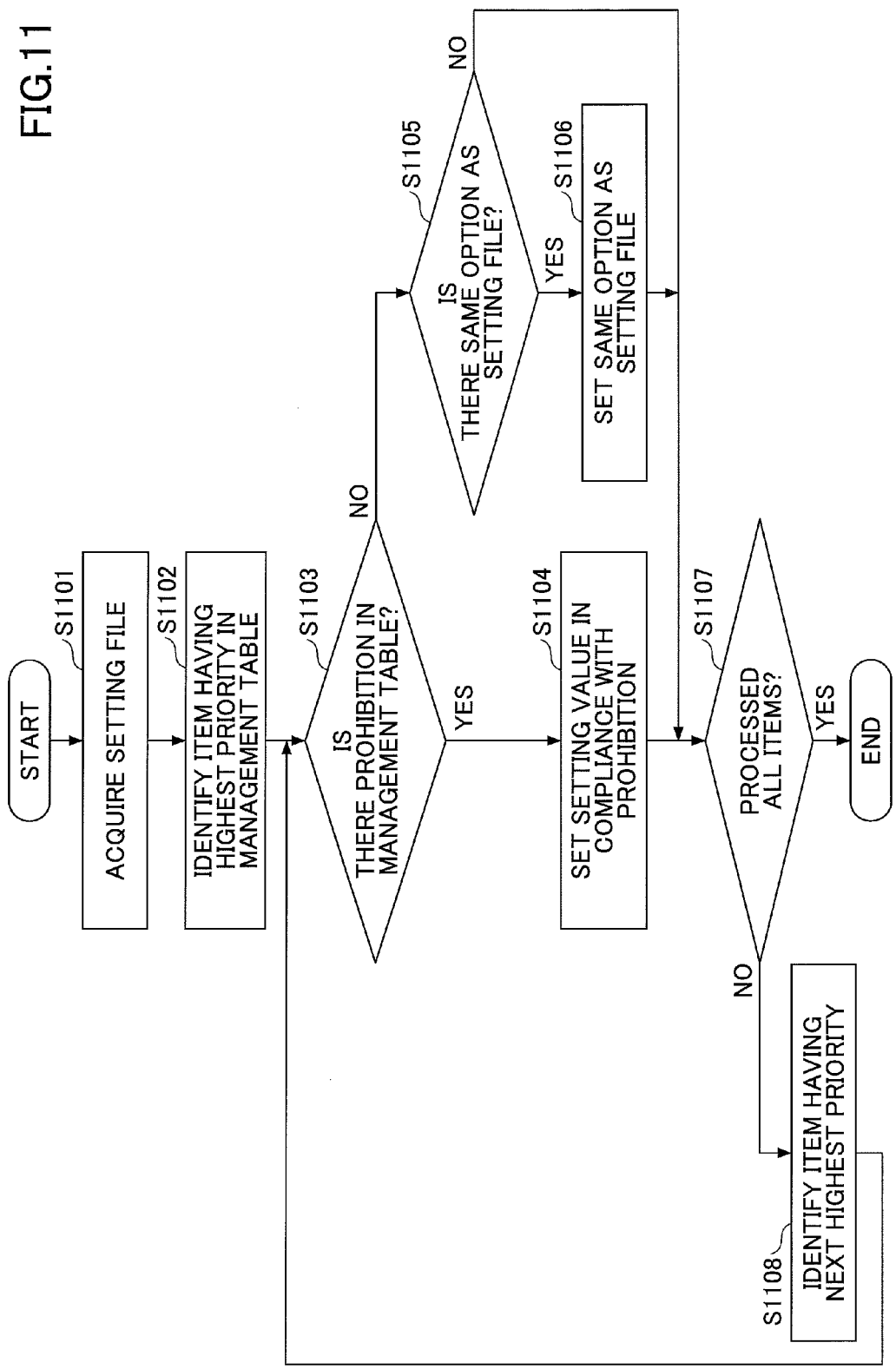
FIG. 11 is a flowchart of a process by function managing units according to the first embodiment of the present invention.

Next, by referring to FIG. 11, a description is given of the process performed by the function managing units 160 and 260 according to the present embodiment. FIG. 11 is a flowchart of a process by the function managing units 160 and 260 according to the first embodiment. Note that FIG. 11 indicates details of the process of step S712 of FIG. 7. Note that in FIG. 7, the setting file 30 is imported into the printer driver 20; and therefore the process of FIG. 11 is described as a process by the printer driver 20; however, the printer driver 10 may also perform the same process.

When the function managing unit 260 according to the present embodiment acquires the setting file 30 from the setting managing unit 240 (step S1101), the function managing unit 260 refers to the management table 261, and identifies the item having the highest priority, among the items included in the setting file 30 (step S1102).

Next, the function managing unit 260 determines whether there is a prohibition in the item identified in step S1102 (step S1103). In step S1103, when there is a prohibition, the function managing unit 260 sets a setting value in compliance with the prohibition, with respect to the setting value of the corresponding item in the management table 261 (step S1104), and proceeds to step S1107 described below.

In step S1103, when there is no prohibition, with respect to the identified item, the function managing unit 260 determines whether there is a setting value, which matches the setting value in the setting file 30, among the options in the management table 261 (step S1105). When there is no corresponding option in step S1105, the function managing unit 160 proceeds to step S1107 described below.

In step S1105, when there is a corresponding option, the function managing unit 260 sets the corresponding option in the setting value of the identified item, in the management table 261 (step S1106).

Next, the function managing unit 260 determines whether the processes of step S1105 and onward have been executed, with respect to all of the items included in both the setting file 30 and the management table 261 (step S1107).

In step S1107, when the processes have not been executed with respect to all of the items, the function managing unit 260 identifies the item having the next highest priority in the setting file 30 (step S1108), and returns to step S1103.

In step S1107, when the processes have been executed with respect to all of the items, the function managing unit 260 ends the process.

Figure 12:
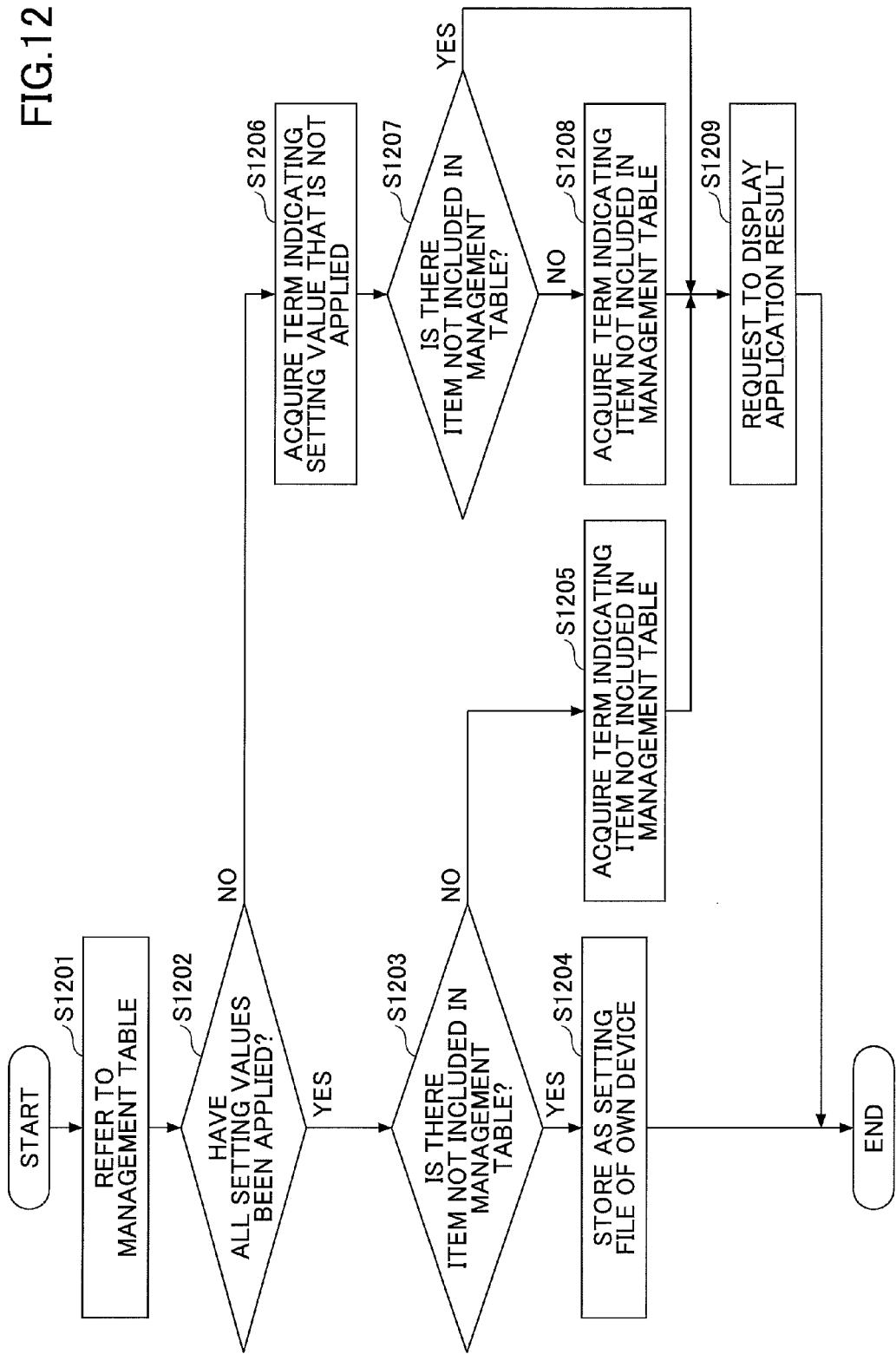
FIG. 12 is a flowchart of a process by a setting managing unit according to the first embodiment of the present invention.

Next, by referring to FIG. 12, a description is given of a process by the setting managing unit 240. FIG. 12 is a flowchart of a process by the setting managing unit 240 according to the first embodiment. Note that the process of FIG. 12 indicates details of step S713 of FIG. 7. Note that, similar to FIG. 11, the process of FIG. 12 is described as a process by the printer driver 20; however, the printer driver 10 may also perform the same process.

The setting managing unit 240 according to the present embodiment refers to the management table 261 of the function managing unit 260 (step S1201), and determines whether the setting values of the setting file 30 are applied, with respect to all of the items included in both the management table 261 and the setting file 30 (step S1202). Said differently, the setting managing unit 240 determines whether the setting values matching those of the setting file 30 have been set, in the management table 261. In step S1202, when the setting values do not match with respect to all of the items included in both the management table 261 and the setting file 30, the setting managing unit 240 proceeds to step S1206 described below.

In step S1202, when the setting values match with respect to all of the items included in both the management table 261 and the setting file 30, the setting managing unit 240 determines whether there is an item, which is included in the setting file 30, that is not included in the management table 261 (step S1203).

In step S1203, when there is no corresponding item in the setting file 30, the setting managing unit 240 acquires the combinations of items and setting values in the management table 261, as a setting file, and stores the setting file in the print setting information storage unit 220 (step S1204), and ends the process.

In the present embodiment, this case is referred to as a state in which the setting file 30 has been applied to the printer driver 20.

In step S1203, when there is a corresponding item in the setting file 30, the setting managing unit 240 acquires a term indicating the item that is not included in the management table 261, from the term file 40 that has been acquired together with the setting file 30 (step S1205), and proceeds to step S1209 described below.

Furthermore, in step S1202, when there an item for which the setting values do not match, among the items included in both the management table 261 and the setting file 30, the setting managing unit 240 refers to the term file 40, and acquires a term indicating a setting value of the setting file 30, with respect to the item for which the setting values do not match (step S1206).

Next, the setting managing unit 240 determines whether there is an item that is not included in the management table 261, among the items included in the setting file 30 (step S1207). In step S1207, when there is no corresponding item, the setting managing unit 240 proceeds to step S1209 described below.

In step S1207, when there is a corresponding item, the setting managing unit 240 acquires a term indicating the item that is not included in the management table 261, from the term file 40 (step S1208).

Next, the setting managing unit 240 uses the term acquired from the term file 40, to send a report of the content of the processing result indicating that the setting file 30 is not applied, and a request to display the report, to the display unit 230 (step S1209), and ends the process.

Figure 13:
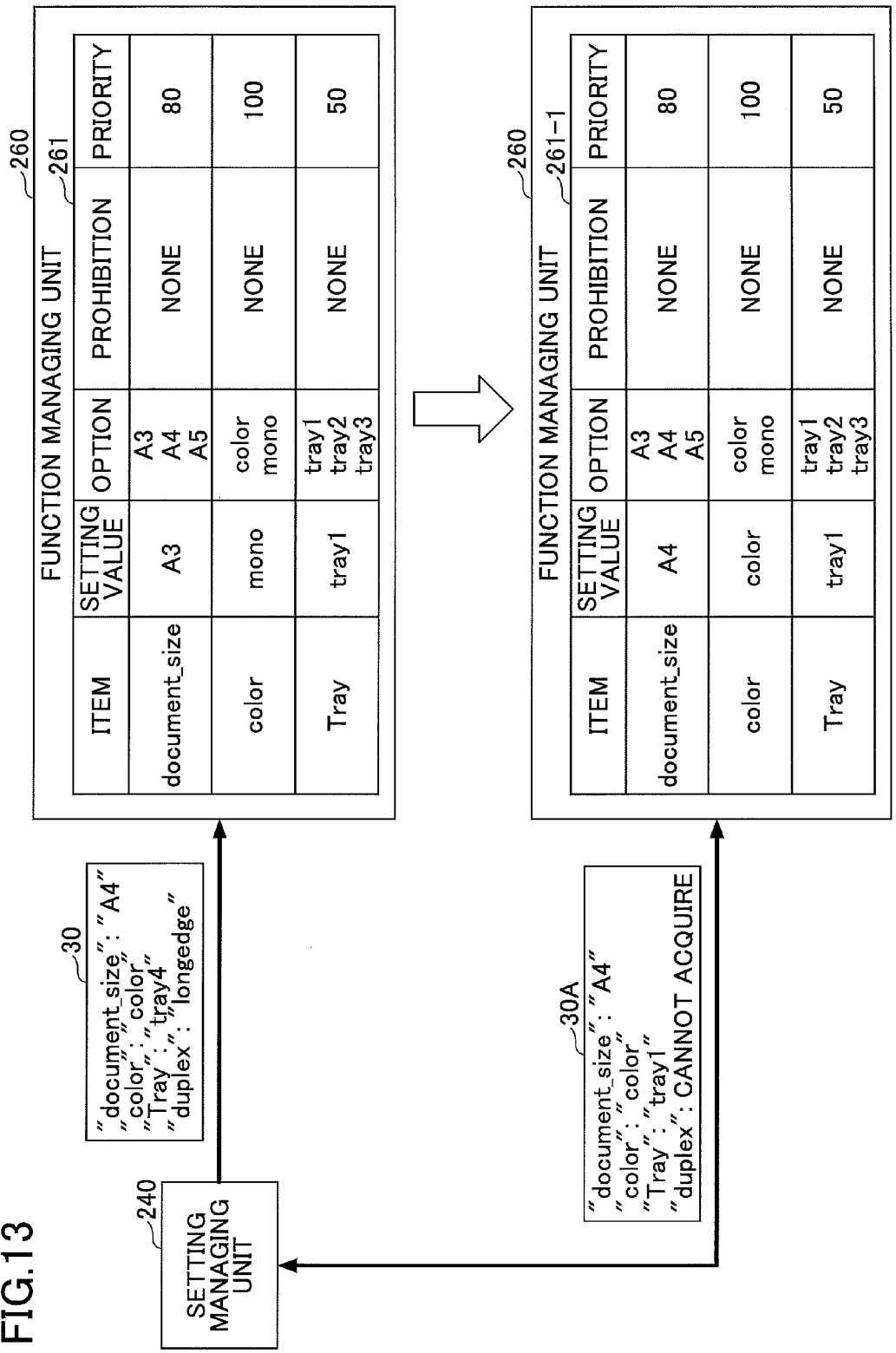
FIG. 13 is a first diagram for describing a process by the function managing unit according to the first embodiment of the present invention.

In the following, by referring to FIGS. 13 and 14, a further description is given of a process by the function managing unit 260 according to the present embodiment. FIG. 13 is a first diagram for describing a process by the function managing unit 260 according to the first embodiment.

When the setting file 30 is imported, the function managing unit 260 according to the present embodiment refers to the management table 261, and identifies the item "color" as the item having the highest priority. In the management table 261, there is no prohibition for the item "color", in the option of the item "color", and there is a setting value "Color" that matches the setting value in the setting file 30. Therefore, the function managing unit 260 sets the setting value "Color", as the setting value of the item "color" in the management table 261.

Furthermore, in the management table 261, there is no prohibition for the item "Tray", but in the option, there is no setting value "tray4" that matches the setting value of the setting file 30. Therefore, the function managing unit 260 does not change the setting value of the item "Tray" in the management table 261, and leaves the setting value "tray1" unchanged.

When process of applying the setting file 30 is performed as described above, the management table 261 will become a management table 261-1.

The setting managing unit 240 according to the present embodiment acquires four combinations of items and setting values included in the setting file 30, from the management table 261-1, and sets the acquired information as a setting file 30A. Then, the setting managing unit 240 determines whether the setting values of the respective items in the setting file 30A match the setting values of the respective items in the setting file 30.

In the example of FIG. 13, the setting value "tray1" of the item "Tray" in the management table 261-1, does not match the setting value "tray4" of the setting file 30. Therefore, the setting managing unit 240 refers to the term file 40 and acquires a term corresponding to the setting value "tray4".

Furthermore, in the example of FIG. 13, the management table 261-1 does not include an item "duplex". This means that the printer, to which the printer driver 20 corresponds, does not include a function indicated by the item "duplex". Therefore, the setting managing unit 240 acquires a term corresponding to the item "duplex", from the term file 40.

Then, the setting managing unit 240 uses the acquired terms to display a result of the applying process, by the display unit 230. Details of a display example of the result of the process are described below.

That is, in the present embodiment, a pair of an item and a setting value is considered as one function. Then, in the present embodiment, it is determined whether there is a pair, which matches the pair of an item and a setting value included in the setting file 30, among the pairs of items and setting values formed by using the options of the respective items as setting values, in the management table 261 included in the function managing unit 260. Then, in the present embodiment, when there is a pair of an item and a setting value that matches that of the setting file 30, among the pairs that can be formed in the management table 261, it is considered that a function, which corresponds to the matching item and setting value, is included in the management table 261.

Figure 14:
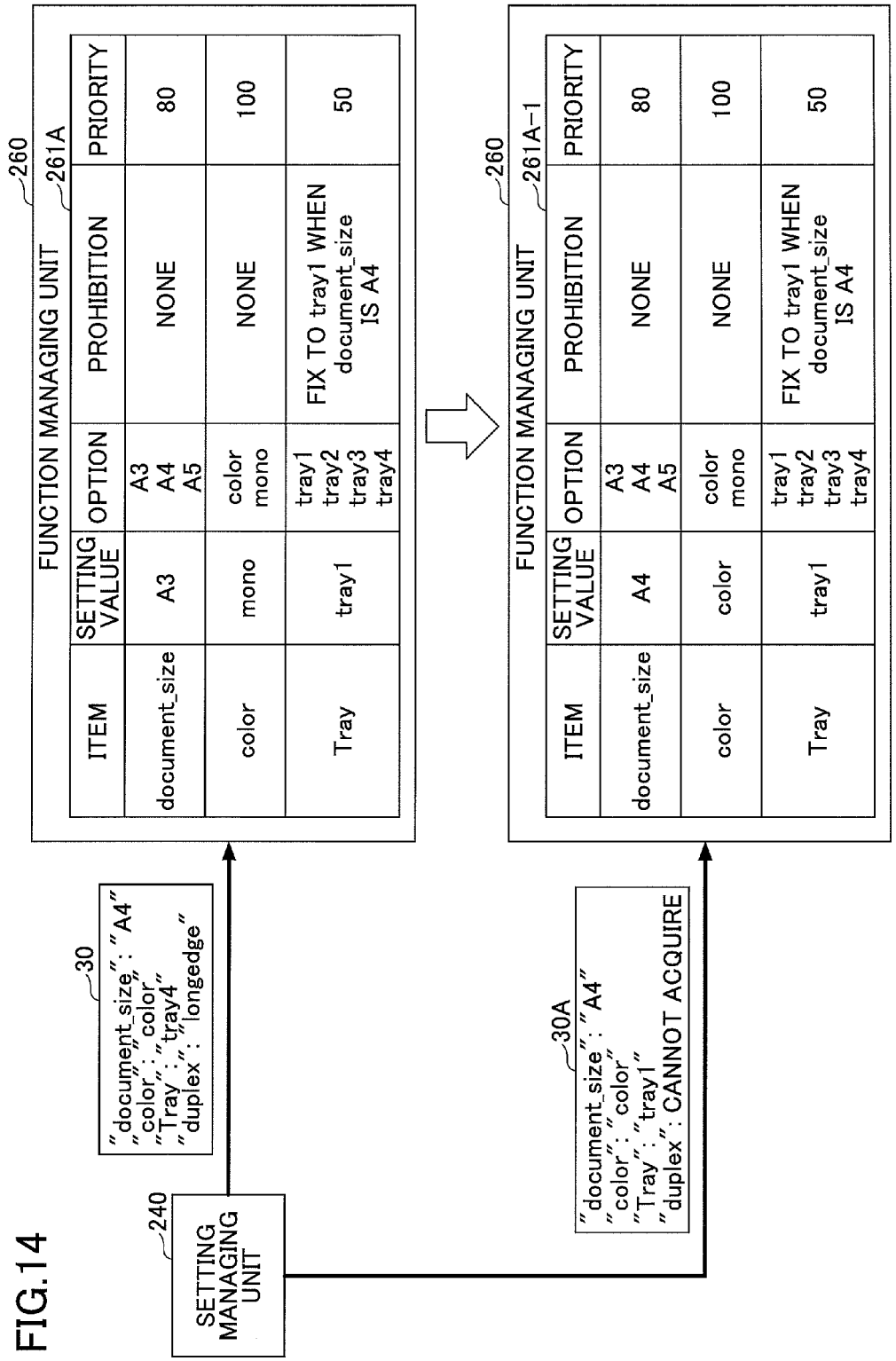
FIG. 14 is a second diagram for describing a process by the function managing unit according to the first embodiment of the present invention.

FIG. 14 is a second diagram for describing a process by the function managing unit 260 according to the first embodiment. In a management table 261A illustrated in FIG. 14, a prohibition is set with respect to the item "Tray".

Thus, the management table 261A includes, as an option of the item "Tray", a setting value "tray4", which is the setting value of the item "Tray" in the setting file 30; however, the function managing unit 260 sets a setting value "tray1" to comply with the prohibition.

Therefore, in the example of FIG. 14, when the process of applying the setting file 30 is performed, the management table 261A will become a management table 261A-1.

Furthermore, in the example of FIG. 14, a setting value "tray4" is included as an option of the item "Tray" in the management table 261A-1; and therefore the setting managing unit 240 does not refer to the term file 40 to acquire the setting value "tray4". In this case, the setting managing unit 240 may display the result of the process with respect to the item "Tray", by using an option of the item "Tray" in the management table 261A.

Next, a description is given of an example of a screen displayed by the display unit 230. The display unit 230 according to the present embodiment may display a screen described below, on the display, etc., of the information processing apparatus 200 in which the printer driver 20 is installed.

Figure 15:
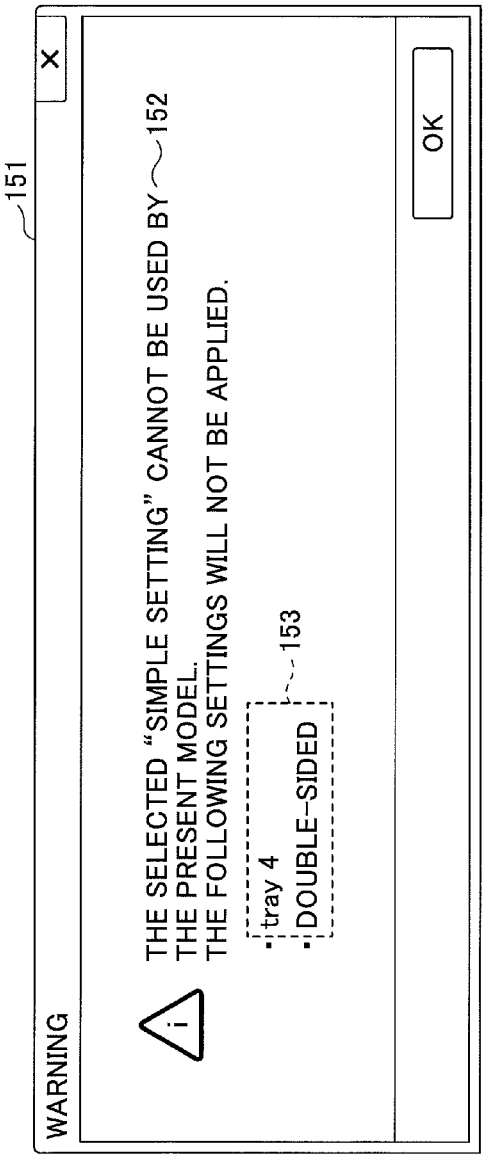
FIG. 15 illustrates an example of a screen displaying the content of the result of an applying process according to the first embodiment of the present invention.

FIG. 15 illustrates an example of a screen displaying the content of the result of an applying process according to the first embodiment.

A screen 151 of FIG. 15 is an example of a screen displaying the content of the processing result reported from the setting managing unit 240 to the display unit 230, for example, in step S1209 of FIG. 12.

In the screen 151, a message 152 and items 153 are displayed. The message 152 indicates that the setting file 30, which has been stored by "simple setting", cannot be applied. The items 153 are items that cannot be applied, among the items in the setting file 30. In the items 153, an item corresponding to a function that is not included in the printer 400 to which the printer driver 20 corresponds, and an item that does not have an option to be used as the setting value, are included.

In the screen 151, the term "double-sided" included in the items 153 is a term corresponding to a function that is not included in the printer 400, and is a term acquired from the term file 40 that has been imported together with the setting file 30 into the printer driver 20.

Furthermore, the term "tray4" included in the items 153 is a term corresponding to a setting value that is not included in the printer 400, and is a term acquired from the term file 40.

In this way, according to the present embodiment, it is possible to display a message indicating that the setting file 30 cannot be applied, and the items for which the settings cannot be applied. Thus, according to the present embodiment, when the print settings cannot be applied, it is possible to present the content of the setting that cannot be applied.

Figure 16:
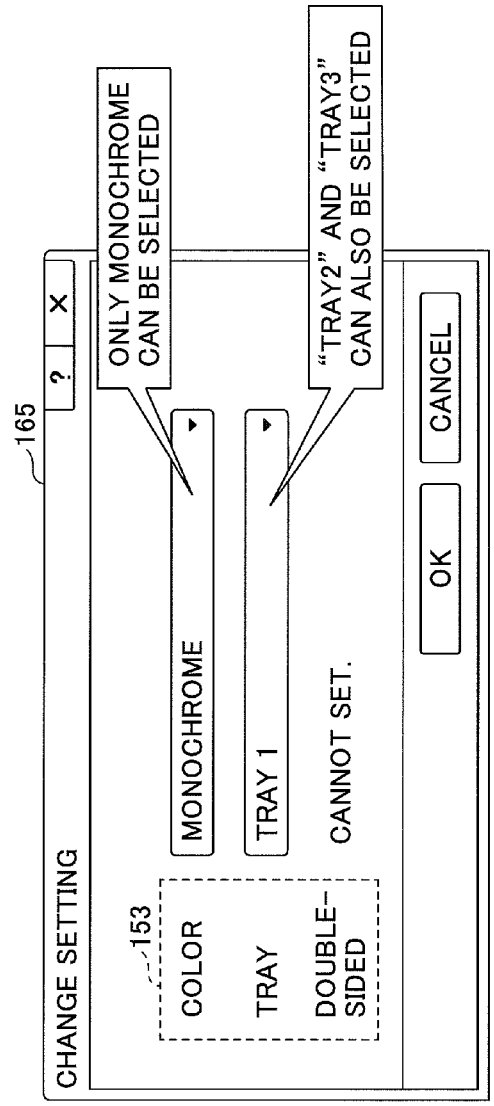
FIG. 16 illustrates an example of a print setting change screen according to the first embodiment of the present invention.

Next, by referring to FIG. 16, a description is given of a print setting change screen. FIG. 16 illustrates an example of a print setting change screen according to the first embodiment.

A screen 165 illustrated in FIG. 16 is a screen displayed by the display unit 230, for example, in step S715 of FIG. 7.

The screen 165 illustrated in FIG. 16 is an example of a screen for changing the settings, for example, with respect the item "color", an item "tray", and an item "double-sided printing", which are the items 153 for which setting values cannot be applied in FIG. 15. Furthermore, the screen 165 is an example of a case where the function managing unit 260 has stored the management table 261 (see FIG. 13).

In the management table 261, only monochrome is included as the option of the item "Color". Thus, in the screen 165, only "monochrome" is the option of the function "color" corresponding to the item "Color".

Furthermore, in the management table 261, the options of the function "tray" corresponding to the item "Tray", are "tray 1" through "tray 3", and therefore the options of the function "tray" in the screen 165, are "tray 1" through "tray 3".

Second Embodiment

In the following, a description is given of a second embodiment by referring to drawings. The second embodiment is different from the first embodiment in that the printer driver is a universal printer driver. Thus, in the following description of the second embodiment, only the points that are different from those of the first embodiment are described, and the same functional elements as those of the first embodiment are denoted by the same reference numerals as those of the first embodiment, and the descriptions of the same functional elements are omitted.

Figure 17:
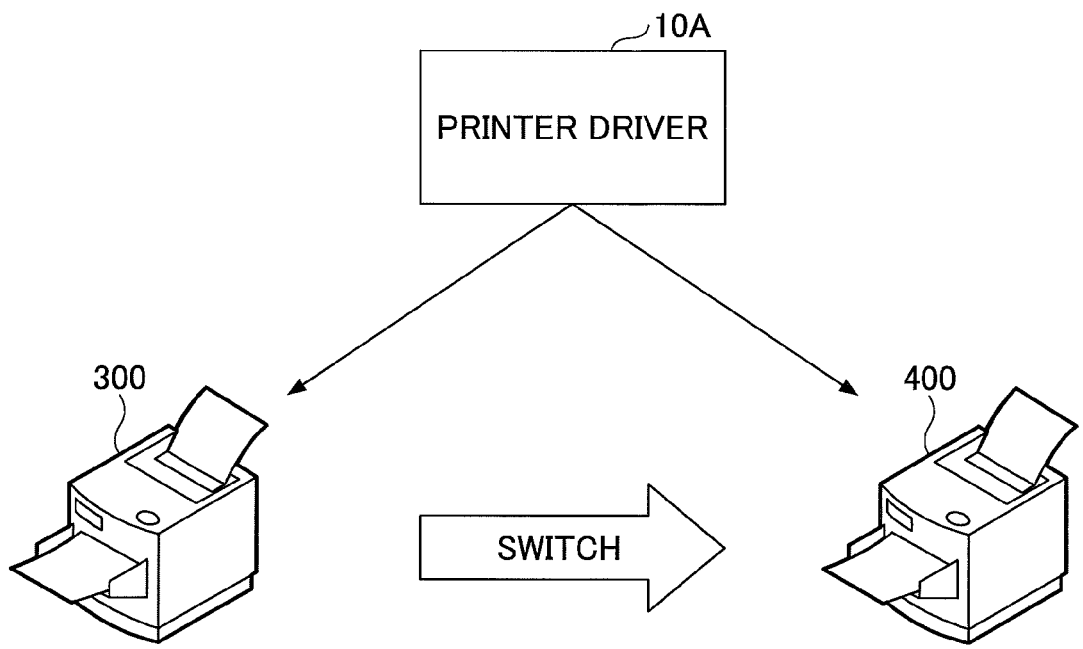
FIG. 17 is for describing the switching of the printer driver according to a second embodiment of the present invention.

FIG. 17 is for describing the switching of the printer driver according to the second embodiment. For example, there are cases where a printer driver 10A, which is installed in the information processing apparatus 100, is a universal printer driver corresponding to image forming apparatuses of a plurality of models. By using the printer driver 10A in this way, even when the printer 300 and the printer 400 are of different models, a single printer driver can cause the printer 300 and the printer 400 to perform image processing. Thus, in the present embodiment, as illustrated in FIG. 17, the information processing apparatus 100 can switch the image processing apparatus to perform image processing.

Said differently, the printer driver 10A according to the present embodiment can change into a state corresponding to each of a plurality of printers. That is, when the printer 400 is selected while the printer driver 10A according to the present embodiment is in a first state corresponding to the printer 300, the printer driver 10A can switch from the first state to a second state corresponding to the printer 400.

Figure 18:
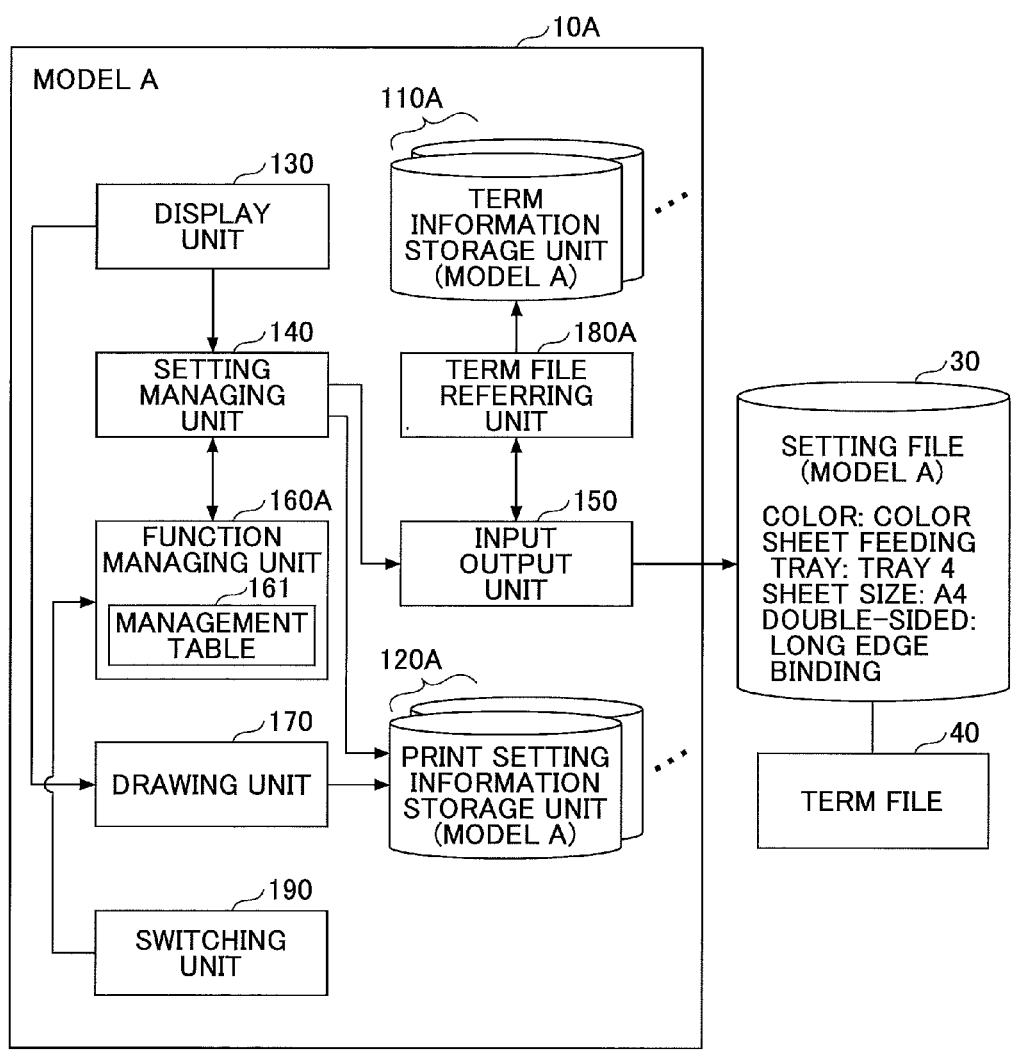
FIG. 18 illustrates the functions of the printer driver according to the second embodiment of the present invention.

FIG. 18 illustrates the functions of the printer driver 10A according to the second embodiment. The printer driver 10A according to the present embodiment includes a term information storage unit 110A, a print setting information storage unit 120A, the display unit 130, the setting managing unit 140, the input output unit 150, a function managing unit 160A, the drawing unit 170, a term file referring unit 180A, and a switching unit 190.

The term information storage unit 110A stores a term file for each of the plurality of models of printers corresponding to the printer driver 10A. Each term file includes terms corresponding to all of the items included in the print settings of each printer, and terms corresponding to the setting values (options) of the items. Specifically, for example, when the printer driver 10A can correspond to printers of a model A, a model B, and a model C, the term information storage unit 110A stores term files, each including terms corresponding to items included in the print settings and the setting values (options) of the items, for the respective three models.

The print setting information storage unit 120A stores print setting information for each of the plurality of models of printers corresponding to the printer driver 10A.

The function managing unit 160A stores a management table 161 for each of the plurality of models of printers corresponding to the printer driver 10A. For example, when the printer driver 10 can correspond to printers of a model A, a model B, and a model C, the function managing unit 160A stores the management table 161 indicating functions of each of these three models.

The term file referring unit 180A refers to the term file corresponding to the model of the printer that is the target of applying the setting file 30, when displaying the content of the result of the applying process.

The switching unit 190 switches the model of the printer to which the printer driver 10A corresponds, according to a user's operation, etc.

FIG. 19 is a sequence diagram of an operation of the printer driver 10A according to the second embodiment. FIG. 19 indicates a case of referring to the print setting information, which has been set when the printer driver 10A has been in a state corresponding to the printer 300 of the model A, when the printer driver 10A is in a state corresponding to the printer 400 of the model B.

When the printer driver 10A accepts an operation of a print setting by the display unit 130 (step S1901), the printer driver 10A transfers the print setting information according to the operation, to the setting managing unit 140 (step S1902). The setting managing unit 140 stores the print setting information in the print setting information storage unit 120A (step S1903).

Next, a description is given of a process of switching printers. Note that the process of switching printers described below may not be executed immediately after the processes of steps S1901 through S1904, but may be executed separately at any timing according to a user's operation.

Here, the printer driver 10A accepts an operation of switching the corresponding printer, by the display unit 130 (step S1904). Specifically, when the display unit 130 accepts an operation of requesting to switch the printer, the display unit 130 displays a "device property screen", and accepts a selection of the printer to perform image processing. Note that the "device property screen" is a screen, etc., indicating a list of printers to which the printer driver, which is installed in the information processing apparatus 100, corresponds.

When a printer is selected, the display unit 130 sends a report of requesting to switch the printer, to the switching unit 190 (step S1905). When the report is received, the switching unit 190 causes the function managing unit 160 to select the management table 161 corresponding to the selected printer (step S1906 and step S1907).

Next, a description is given of a process of applying the print setting information after the printer 300 has been switched to the printer 400, in the printer driver 10A. Note that the process of applying the print setting information described below may not be executed immediately after the processes of steps S1901 through S1907, but may be executed separately at any timing according to a user's operation.

When the printer driver 10A accepts a selection of the print setting information to be applied, by the display unit 130 (step S1908), the printer driver 10A reports that the print setting information has been selected, to the setting managing unit 140 (step S1909).

Next, the setting managing unit 140 transfers the selected print setting information, together with a request to execute a process of applying the print setting information, to the function managing unit 160 (step S1910). The function managing unit 160 receives the execution request and performs a process of applying the received print setting information (step S1911).

The process of step S1911 is the same as the process of step S712 of FIG. 7, except that the function managing unit 160 receives the print setting information instead of receiving the setting file 30, and therefore further descriptions are omitted.

Next, the setting managing unit 140 determines whether the print setting information has been applied, based on the result of the process by the function managing unit 160 (step S1912).

The process of step S1912 is the same as the process of step S713 of FIG. 7, except that when acquiring the terms, reference is made to the term information storage unit 110A corresponding to the model B that is the model of the printer 400 that is the switching destination, instead of referring to the term file 40, and therefore further descriptions are omitted.

Then, when the setting managing unit 140 determines that the print setting information cannot be applied, the setting managing unit 140 requests the display unit 130 to display the result of the process (step S1913).

Furthermore, the printer driver 10A displays, by the display unit 230, a change screen for changing the content of the print setting information (step S1914). Details of the change screen are described below.

When the display unit 130 accepts a change in the content of the print setting information at the change screen (step S1915), the setting managing unit 140 applies the content of the change to the print setting information. The setting managing unit 140 stores the print setting information in the print setting information storage unit 120A (step S1916), and ends the process.

As described above, the printer driver 10A according to the present embodiment includes the term information storage unit 110A corresponding to printers of a plurality of models, and therefore the printer driver 10A does not create a term file. When the printer driver 10A according to the present embodiment displays the result of the process of applying the print setting information, the printer driver 10A is to refer to the term information storage unit 110A corresponding to the model of the printer that is the switching destination.

Figure 20A:
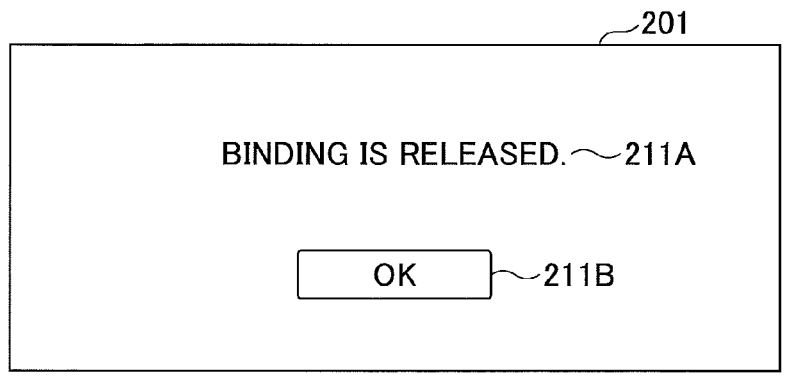
FIGS. 20A through 20C illustrate examples of displayed screens according to the second embodiment of the present invention.
Figure 20B:
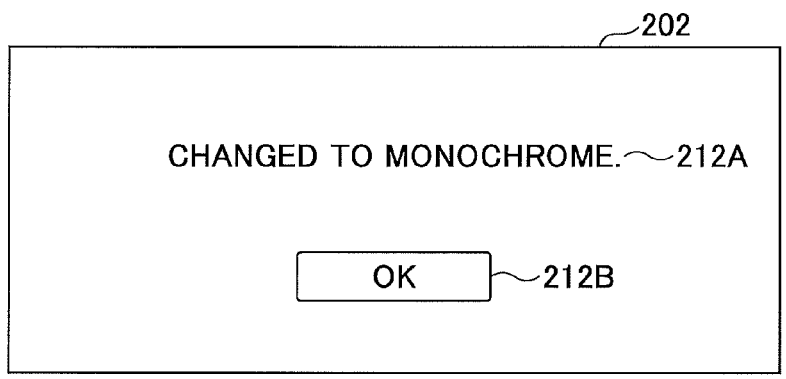
Figure 20C:
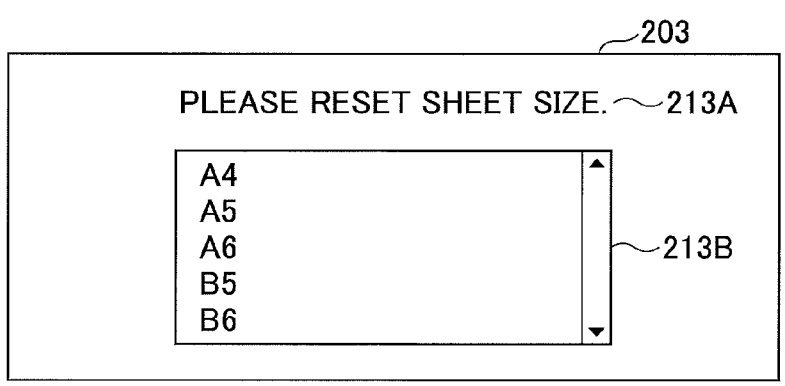

In the following, by referring to FIGS. 20A through 20C, a description is given of examples of screens displayed by the display unit 130. FIGS. 20A through 20C illustrate examples of displayed screens according to the second embodiment.

A screen 201 illustrated in FIG. 20A indicates an example of a case where the item relevant to binding cannot be applied. The screen 201 displays a message 211A prompting to release the setting relevant to binding, and a button 211B for instructing the change.

A screen 202 illustrated in FIG. 20B indicates an example of a case where the printer 400 does not include a color function. The screen 202 displays a message 212A prompting to change the setting of color printing to a setting of monochrome printing, and a button 212B for instructing the change.

A screen 203 illustrated in FIG. 20C indicates an example of a case where the printer 400 does not correspond to a sheet size included in the selected print setting information. The screen 203 displays a message 213A prompting to change the sheet size, and a field 213B for selecting the sheet size.

That is, in the present embodiment, an indication that the print setting information has not been applied, the content of the print setting to be changed, and operation members for instructing the change, are displayed at the same time.

Figure 21:
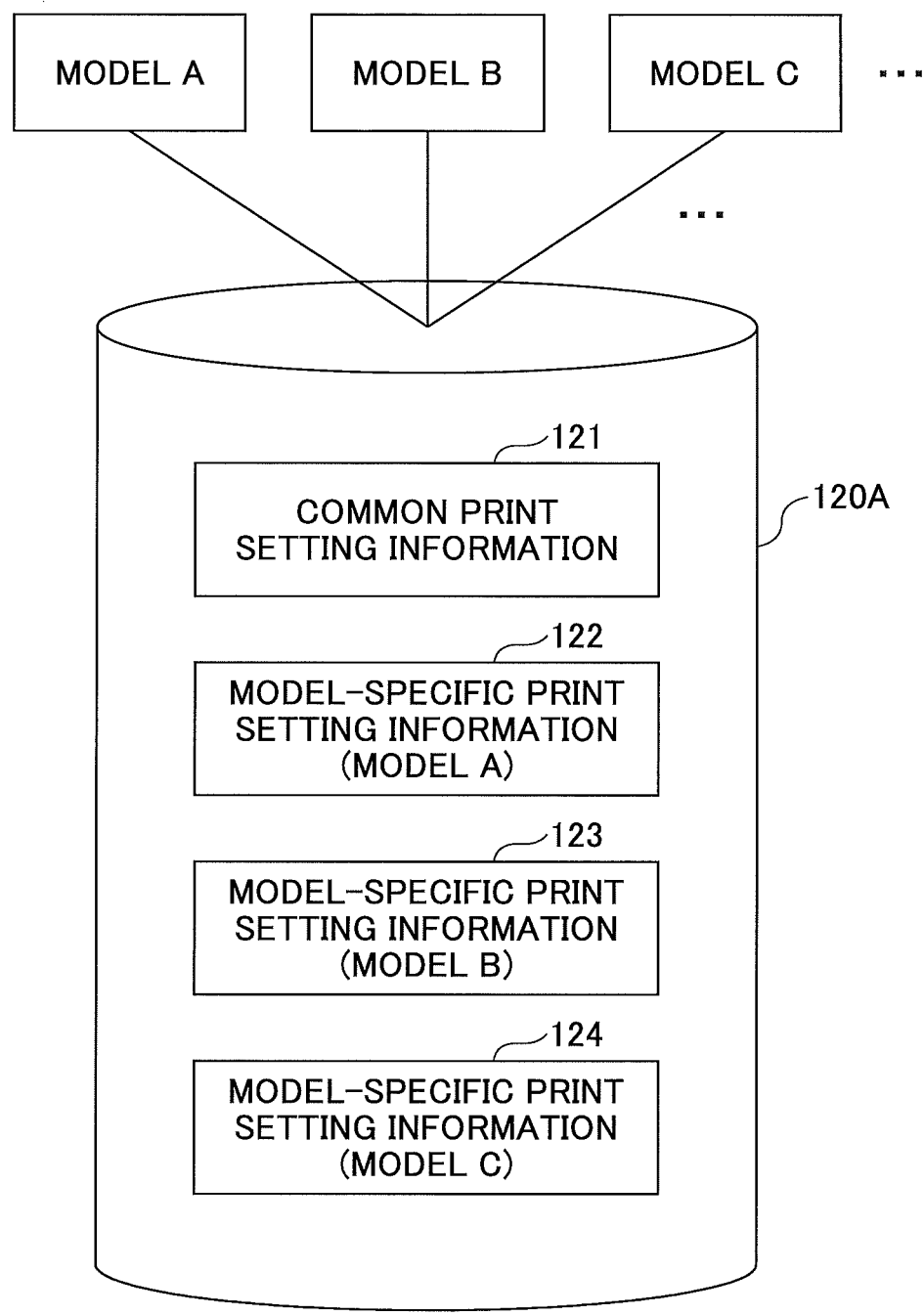
FIG. 21 is a first diagram for describing a print setting information storage unit according to the second embodiment of the present invention.
Figure 22:
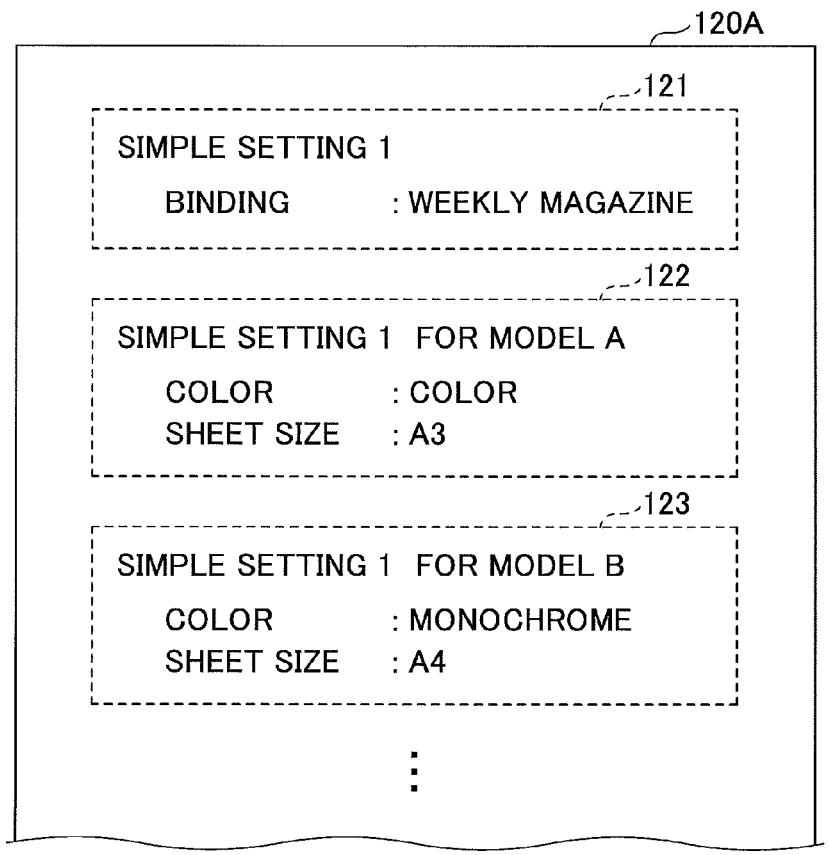
FIG. 22 is a first diagram for describing an example of print setting information stored in the print setting information storage unit according to the second embodiment of the present invention.

Next, referring to FIGS. 21 and 22, a description is given of an example of a method of storing the print setting information in the print setting information storage unit 120A according to the present embodiment. FIG. 21 is a first diagram for describing the print setting information storage unit 120A according to the second embodiment.

In the print setting information storage unit 120A according to the present embodiment, the print setting, which is common to a plurality of models of printers to which the printer driver 10A corresponds, is stored as common print setting information 121, and print settings, which differ according to the models, are stored as model-specific print setting information.

In the example of FIG. 21, the printer driver 10A corresponds to the printers of a model A, a model B, and a model C.

Therefore, in the print setting information storage unit 120A, the common print setting information 121, model-specific print setting information 122 for a model A, model-specific print setting information 123 for a model B, and model-specific print setting information 124 for a model C are stored.

In this way, in the example of FIG. 21, a print setting that is common to the models is stored as common print setting information, and therefore the memory capacity of the print setting information storage unit 120A can be reduced.

FIG. 22 is a first diagram for describing an example of print setting information stored in the print setting information storage unit 120A according to the second embodiment.

In the example of FIG. 22, the common print setting information 121 common to the models includes an item "binding" and a setting value "weekly magazine". Furthermore, the model-specific print setting information 122 for a model A includes an item "color" and a setting value "color" and an item "sheet size" and a setting value "A3", and the model-specific print setting information 123 for a model B includes an item "color" and a setting value "monochrome" and an item "sheet size" and a setting value "A4".

Therefore, in this case, for example, in the printer of the model A, the print setting information of the model A will include an item "binding" and a setting value "weekly magazine", an item "color" and a setting value "color", and an item "sheet size" and a setting value "A3".

Figure 23:
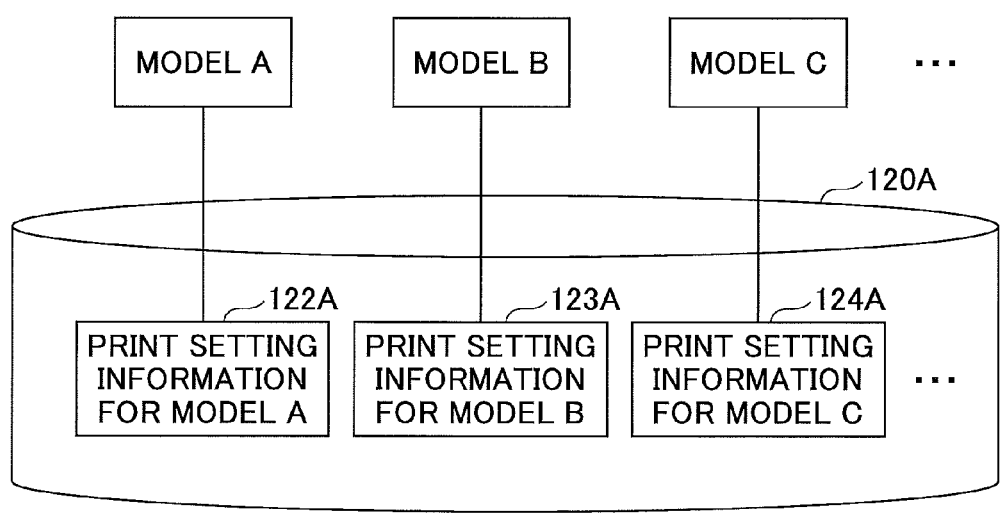
FIG. 23 is a second diagram for describing the print setting information storage unit according to the second embodiment of the present invention.
Figure 24:
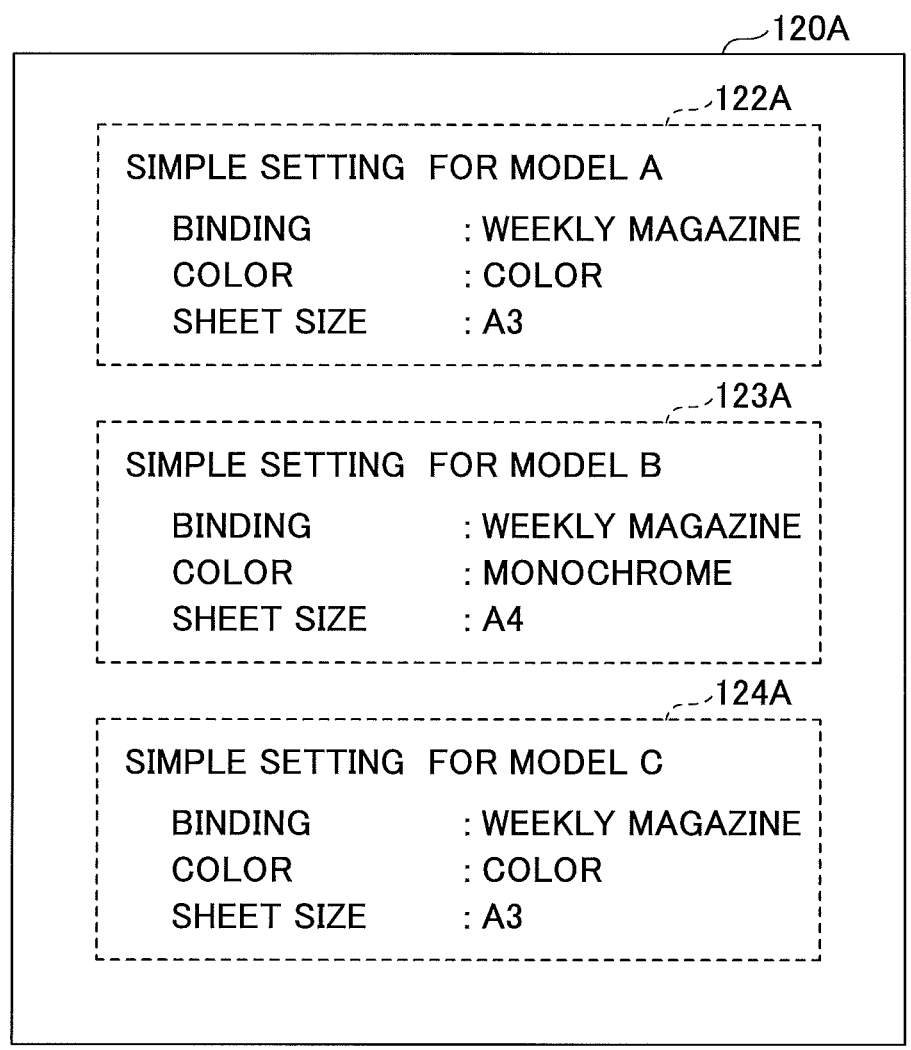
FIG. 24 is a second diagram for describing an example of print setting information stored in the print setting information storage unit according to the second embodiment of the present invention.

Next, referring to FIGS. 23 and 24, a description is given of another example of a method of storing the print setting information in the print setting information storage unit 120A according to the present embodiment. FIG. 23 is a second diagram for describing the print setting information storage unit 120A according to the second embodiment.

In the example of FIG. 23, the print setting information storage unit 120A stores print setting information for each model of a printer to which the printer driver 10A corresponds. In the example of FIG. 23, the printer driver 10A corresponds to a model A, a model B, and a model C, and therefore, the print setting information storage unit 120A stores print setting information for model A 122A, print setting information for model B 123A, and print setting information for model C 124A.

In this way, in the example of FIG. 23, the print setting information may be separately stored for each of the models, and therefore even when there is a print setting that is common to different models, the common print setting may be easily changed, for example, for one model.

FIG. 24 is a second diagram for describing an example of print setting information stored in the print setting information storage unit 120A according to the second embodiment.

In the example of FIG. 24, the print setting information is separately stored for each of the models. In the print setting information storage unit 120A illustrated in FIG. 24, print setting information 122A is print setting information of a model A, print setting information 123A is print setting information of a model B, and print setting information 124A is print setting information of a model C.

In the present embodiment, as described above, by storing the print setting information for each of the models, for example, a setting value, which is of an item "binding" that is common to all models, can be easily changed, without considering the relationship with another model.

Third Embodiment

In the following, a description is given of a third embodiment by referring to drawings. The third embodiment is different from the first embodiment in that a setting file is applied to a printer driver of a different version. Thus, in the following description of the third embodiment, only the points that are different from those of the first embodiment are described, and the same functional elements as those of the first embodiment are denoted by the same reference numerals as those of the first embodiment, and the descriptions of the same functional elements are omitted.

FIG. 25 is a functional block diagram of the printer driver according to the third embodiment. FIG. 25 indicates a case where the setting file 30 and the term file 40 exported from the printer driver 10, are imported into a printer driver 10B.

In this case, the printer drivers 10 and 10B both correspond to the printer 300 of the model A; however, it is assumed that the printer driver 10 is of the newest version while the printer driver 10B is of a past version. Furthermore, in the example of FIG. 25, it is assumed that in the management table 161 of the function managing unit 160 of the printer driver 10, new items (functions) are added. These new items (functions), which are added to the management table 161 of the function managing unit 160, are not included in a management table 161B of a function managing unit 160B of the printer driver 10B.

In the following description, it is assumed that the management table 161B does not include an item "double-sided", or an option "A4" with respect to an item "sheet feeding tray".

In this case, as a result of a process of applying the setting file 30, the function managing unit 160B of the printer driver 108 reports that a term corresponding to an item "double-sided" and an option corresponding to the setting value "A4" are not included in the management table 161B, to the setting managing unit 140.

Therefore, the printer driver 10B performs, by the setting managing unit 140, the same process as that of the setting managing unit 240 of the printer driver 20 according to the first embodiment, and displays the content of the processing result by the display unit 130.

That is, the printer driver 10B acquires, from the term file 40, terms corresponding to the item "double-sided" and the setting value "A4" that are not included in the management table 161B, and uses the acquired terms to display the content of the processing result.

By performing the above operation, for example, when an attempt is made to apply the print settings, which have been made by the printer driver of a past version, to the printer driver 10 to which a new function has been added due to a version upgrade, etc., but the print settings cannot be applied, it is possible to present the content of the setting that cannot be applied.

Note that the embodiments described above are for applying a setting file to a printer driver; however, the embodiments are not so limited. The present embodiment is not only applicable to a printer driver, but is also applicable to any driver for making various settings with respect to a device coupled to the information processing apparatus 100. Therefore, in the present embodiment, for example, the device coupled to the information processing apparatus 100 may be a projector, a scanner, or a camera, etc. In this case, the above embodiments are applicable to the driver corresponding to the device coupled to the information processing apparatus 100.

According to one embodiment of the present invention, the contents of settings that have not been applied when applying settings, can be presented to a user.

The information processing apparatus, the information processing method, and the image processing system are not limited to the specific embodiments described in the detailed description, and variations and modifications may be made without departing from the spirit and scope of the present invention.

Note that the printer 300 according to an embodiment is an example of the first device, the printer 400 according to an embodiment is an example of a second device, and the setting file 30 according to an embodiment is an example of first setting information. Furthermore, the management table 261 according to an embodiment is an example of function information, the term file 40 according to an embodiment is an example of first term information, and the computer according to an embodiment is an example of an information processing apparatus. Furthermore, the print setting information storage unit 120A according to an embodiment is an example of a setting information storage device.

What is claimed is:

1. An information processing apparatus comprising:
   a memory configured to store computer-executable instructions; and
   one or more processors configured to execute the computer-executable instructions such that the one or more processors execute a process including:
   reading first setting information indicating a first setting content with respect to a first device, the first setting information being input to the information processing apparatus by a user via a display device;
   referring to function information indicating one or more functions of a second device, and determining whether there is a function, which is not included in the one or more functions of the second device, among one or more functions corresponding to the first setting content; and
   referring to first term information including a term indicating the first setting content, when there is the function corresponding to the first setting content that is determined as not being included in the one or more functions of the second device, and displaying, on the display device, the function, which is determined as not being included in the one or more functions of the second device, in association with the term, such that the function of the first device that cannot be applied to the second device is presented to the user.

2. The information processing apparatus according to claim 1, wherein the first setting information and the first term information are generated and output by another information processing apparatus other than the information processing apparatus.

3. The information processing apparatus according to claim 2, wherein the process further includes:
   accepting an output request to output second setting information indicating a second setting content of the second device, referring to a term information storage device storing one or more terms indicating the one or more functions of the second device, and generating second term information including the one or more terms indicating the second setting content with respect to the second device; and
   outputting the second setting information and the second term information.

4. The information processing apparatus according to claim 1, wherein the process further includes:
   generating the first setting information of the first device and storing the first setting information in a setting information storage device;

switching from a first state corresponding to the first device to a second state corresponding to the second device; and acquiring the first setting information from the setting information storage device, after switching to the second state.

5. The information processing apparatus according to claim 1, wherein the first setting content includes one or more first setting items with respect to the first device and one or more first setting values respectively corresponding to the one or more first setting items, and the function information includes one or more second setting items with respect to the second device and one or more options of one or more second setting values respectively corresponding to the one or more second setting items.

6. The information processing apparatus according to claim 5, wherein in at least one of a case where the one or more first setting items include a setting item that is not included in the one or more second setting items, and a case where the one or more first setting values include a setting value that is not included in the one or more options of the one or more second setting values, the determining includes determining that there is the function, which is not included in the one or more functions of the second device, in the first setting content.

7. The information processing apparatus according to claim 1, wherein the first device and the second device are image processing apparatuses of different models.

8. An information processing method executed by a computer, the information processing method comprising:

reading first setting information indicating a first setting content with respect to a first device, the first setting information being input by a user via a display device;

referring to function information indicating one or more functions of a second device, and determining whether there is a function, which is not included in the one or more functions of the second device, among one or more functions corresponding to the first setting content; and referring to first term information including a term indicating the first setting content, when there is the function corresponding to the first setting content that is determined as not being included in the one or more functions of the second device, and displaying, on the display device, the function, which is determined as not being included in the one or more functions of the second device, in association with the term, such that the function of the first device that cannot be applied to the second device is presented to the user.

9. An image processing system comprising:

an image processing apparatus;

an information processing apparatus;

a memory configured to store computer-executable instructions; and one or more processors configured to execute the computer-executable instructions such that the one or more processors execute a process including:

reading first setting information indicating a first setting content with respect to another image processing apparatus, the first setting information being input by a user via a display device;

referring to function information indicating one or more functions of the image processing apparatus, and determining whether there is a function, which is not included in the one or more functions of the image processing apparatus, among one or more functions corresponding to the first setting content;

referring to first term information including a term indicating the first setting content, when there is the function corresponding to the first setting content that is determined as not being included in the one or more functions of the image processing apparatus, and displaying, on the display device, the function, which is determined as not being included in the one or more functions of the image processing apparatus, in association with the term, such that the function of the other image processing apparatus that cannot be applied to the image processing apparatus is presented to the user; and outputting print data, which is generated by referring to the first setting content, to the image processing apparatus, wherein the image processing apparatus outputs a result of image processing based on the print data received from the information processing apparatus.

* * * * *